US012801901B2

(12) United States Patent
Wang et al.

(10) Patent No.: US 12,801,901 B2
(45) Date of Patent: Nov. 17, 2026

(54) METHOD, ELECTRONIC DEVICE, AND PRODUCT FOR DETERMINING GENERATIVE MODEL

(71) Applicant: Dell Products L.P., Round Rock, TX (US)

(72) Inventors: Zijia Wang, Weifang (CN); Qiang Chen, Shanghai (CN); Zhisong Liu, Shenzhen (CN); Zhen Jia, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 511 days.

(21) Appl. No.: 18/428,852

(22) Filed: Jan. 31, 2024

(65) Prior Publication Data

US 2025/0217633 A1 Jul. 3, 2025

(30) Foreign Application Priority Data

Dec. 28, 2023 (CN) ......................... 202311839789.5

(51) Int. Cl.
*G06N 3/04* (2023.01)
*G06N 3/0475* (2023.01)
(Continued)

(52) U.S. Cl.
CPC ............. *G06N 3/0475* (2023.01); *G06N 5/04* (2013.01); *G06T 1/005* (2013.01)

(58) Field of Classification Search
CPC ........ G06N 3/0475; G06N 3/094; G06N 5/04; G06N 20/00; G06T 1/005; G06T 1/0021; G06F 21/16
See application file for complete search history.

(56) References Cited

U.S. PATENT DOCUMENTS

2021/0019605 A1* 1/2021 Rouhani ............... G06F 18/213
2023/0121374 A1* 4/2023 Yang ...................... G06N 3/084 706/25
2023/0394298 A1* 12/2023 Rawat .................... G06N 3/094

OTHER PUBLICATIONS

Bellafqira, "Diction: Dynamic Robust White Box Watermarking Scheme", 2022. (Year: 2022).*

(Continued)

*Primary Examiner* — Dave Misir
(74) *Attorney, Agent, or Firm* — Ryan, Mason & Lewis, LLP

(57) ABSTRACT

Embodiments of the present disclosure provide a method for determining a generative model. The method includes embedding a white box watermark and a black box watermark into a generative model. The black box watermark is first embedded into a probability density function of data abstractions in respective layers of the generative model. The method further includes embedding, after the embedding of the black box watermark is completed, the white box watermark into respective layers for outputs of the generative model. Model data is generated by the generative model based on predetermined triggering data. The predetermined triggering data includes a predetermined triggering text or a predetermined triggering image. An identity associated with the generative model is determined based on the model data. Advantageously, the illustrative method is capable of providing double-layer protection for a generative model by embedding two complementary and independent watermarks to resist white box and black box attacks.

20 Claims, 12 Drawing Sheets

(51) Int. Cl.
*G06N 5/04* (2023.01)
*G06T 1/00* (2006.01)

(56) References Cited

OTHER PUBLICATIONS

Rouhani, "DeepSigns: An End-to-End Watermarking Framework for Ownership Protection of Deep Neural Networks", ASPLOS'19, Apr. 13-17, 2019. (Year: 2019).*
J. Zhang et al., "Deep Model Intellectual Property Protection via Deep Watermarking," arXiv:2103.04980v1, Mar. 8, 2021, 14 pages.
J. Zhu et al., "Hidden: Hiding Data With Deep Networks," arXiv:1807.09937v1, Jul. 26, 2018, 22 pages.
M. Tancik et al., "Stegastamp: Invisible Hyperlinks in Physical Photographs," arXiv:1904.05343v2, Mar. 26, 2020, 13 pages.
Y. Uchida et al., "Embedding Watermarks into Deep Neural Networks," arXiv:1701.04082v2, Apr. 20, 2017, 10 pages.
Y. Adi et al., "Turning Your Weakness Into a Strength: Watermarking Deep Neural Networks by Backdooring," arXiv:1802.04633v2, Feb. 14, 2018, 16 pages.
J. Zhang et al., "Passport-aware Normalization for Deep Model Protection," Advances in Neural Information Processing Systems, vol. 33, Dec. 2020, 10 pages.
L. Fan et al., "Rethinking Deep Neural Network Ownership Verification: Embedding Passports to Defeat Ambiguity Attacks," Advances in Neural Information Processing Systems, vol. 32, Dec. 2019, 10 pages.
U.S. Appl. No. 18/127,135 filed in the name of Zijia Wang et al. on Mar. 28, 2023, and entitled "Method, Device, and Computer Program Product for Image Processing.".

* cited by examiner

METHOD, ELECTRONIC DEVICE, AND PRODUCT FOR DETERMINING GENERATIVE MODEL

RELATED APPLICATION

The present application claims priority to Chinese Patent Application No. 202311839789.5, filed Dec. 28, 2023, and entitled "Method, Electronic Device, and Product for Determining Generative Model," which is incorporated by reference herein in its entirety.

FIELD

Embodiments of the present disclosure relate to the field of computers, and more particularly, to a method, an electronic device, and a product for determining a generative model.

BACKGROUND

In the field of machine learning, developing efficient and accurate generative models typically requires a significant amount of time, data, and resources. Generative model watermarking technologies can help protect these efforts, thereby ensuring that the ownership of models is authenticated and protected. By embedding watermarks in a model, a developer can identify his/her work and prevent unauthorized copying or tampering with the model. Model watermarks can also be used to check whether the model has been tampered with or damaged. Ensuring the integrity of a model is crucial in fields such as image creation and medical diagnosis.

By embedding a unique signature or message into a generative model, model watermarking prevents the unauthorized use of the generative model, allowing an owner of the generative model to verify it. Watermarks may be modifications to a specific pattern, data, or algorithm and can be embedded during a training process of the generative model. These watermarks do not affect the performance or accuracy of the generative model. The watermarks also need to be robust enough to be detected even when the generative model is modified, compressed, or used in different environments.

SUMMARY

Embodiments of the present disclosure provide a method, an electronic device, and a product for determining a generative model.

According to a first aspect of the present disclosure, a method for determining a generative model is provided. The method includes embedding a white box watermark and a black box watermark into a generative model, wherein the black box watermark is embedded in a probability density function of data abstractions in respective layers of the generative model, and in response to completion of embedding the black box watermark, the white box watermark is embedded in the respective layers for outputs of the generative model. The method further includes generating model data by the generative model based on predetermined triggering data, wherein the predetermined triggering data includes at least one of a predetermined triggering text and a predetermined triggering image; and determining an identity associated with the generative model based on the model data.

According to a second aspect of the present disclosure, an electronic device for determining a generative model is provided. The electronic device includes at least one processor; and a memory, the memory being coupled to the at least one processor and having instructions stored thereon, wherein the instructions, when executed by the at least one processor, cause the electronic device to perform actions including: embedding a white box watermark and a black box watermark into a generative model, wherein the black box watermark is embedded in a probability density function of data abstractions in respective layers of the generative model, and in response to completion of embedding the black box watermark, the white box watermark is embedded in the respective layers for outputs of the generative model. The actions further include generating model data by the generative model based on predetermined triggering data, wherein the predetermined triggering data includes at least one of a predetermined triggering text and a predetermined triggering image; and determining an identity associated with the generative model based on the model data.

According to a third aspect of the present disclosure, a computer program product is provided. The computer program product is tangibly stored on a non-transitory computer-readable medium and includes machine-executable instructions, wherein the machine-executable instructions, when executed by a machine, cause the machine to perform steps of the method implemented in the first aspect of the present disclosure.

BRIEF DESCRIPTION OF THE DRAWINGS

By more detailed description of example embodiments of the present disclosure, provided herein with reference to the accompanying drawings, the above and other objectives, features, and advantages of the present disclosure will become more apparent, wherein identical reference numerals generally represent identical element in the example embodiments of the present disclosure.

DETAILED DESCRIPTION

Figure 1A:
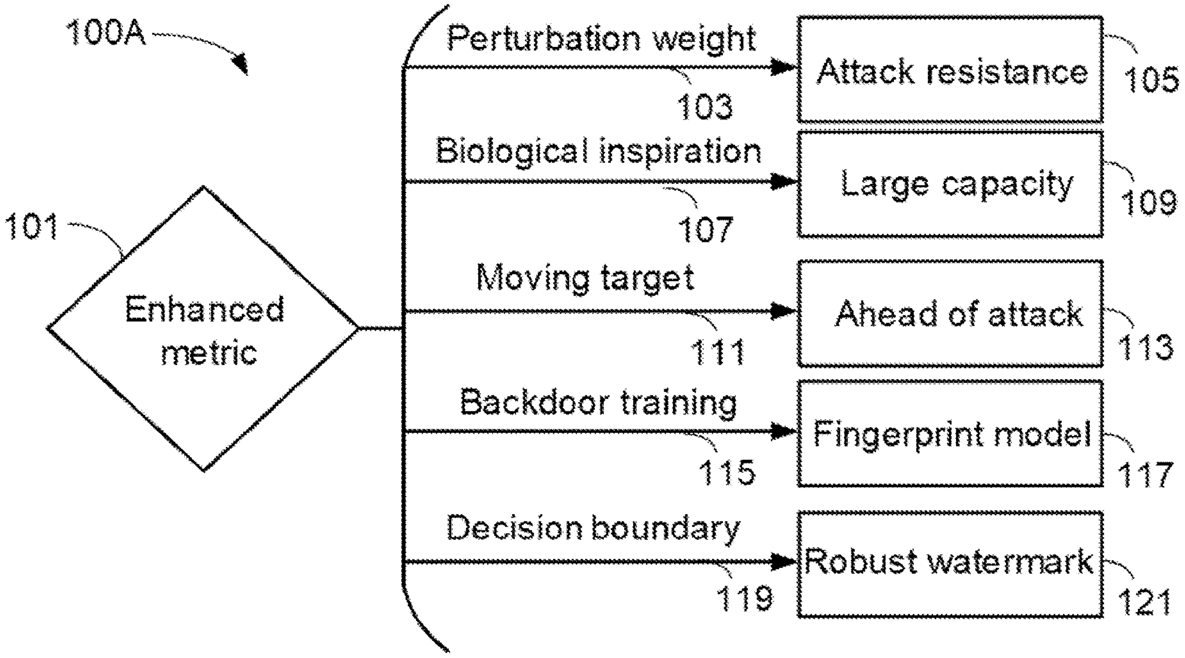
FIG. 1A is a schematic diagram of several methods for an embedded watermark according to an embodiment of the present disclosure.

Illustrative embodiments of the present disclosure will be described below in further detail with reference to the accompanying drawings. Although the accompanying drawings show some embodiments of the present disclosure, it should be understood that the present disclosure may be implemented in various forms, and should not be construed as being limited to the embodiments stated herein. Rather, these embodiments are provided for understanding the present disclosure more thoroughly and completely. It should be understood that the accompanying drawings and embodiments of the present disclosure are for exemplary purposes only, and are not intended to limit the scope of protection of the present disclosure.

In the description of embodiments of the present disclosure, the term "include" and similar terms thereof should be understood as open-ended inclusion, that is, "including but not limited to." The term "based on" should be understood as "based at least in part on." The term "an embodiment" or "the embodiment" should be understood as "at least one embodiment." The terms "first," "second," and the like may refer to different or identical objects. Other explicit and implicit definitions may also be included below.

It is a challenge on how to protect a deep learning model by using robust and secure watermarking technologies. Unauthorized use of a model is unstable and causes losses to an owner of a generative model. Unauthorized use of a generative model may be performed in various ways, such as generative model extraction, reverse engineering of a generative model, cloning of a generative model, or unauthorized use of a generative model.

However, embedding a watermark in a generative model faces many problems, such as the need for access to have a deep understanding of the internal structure of the model and an access permission. Embedding a watermark may increase the size or complexity of the model, and an embedding page of the watermark may affect the performance of the model. In some cases, a black box watermark may require a large number of triggering samples to ensure its detectability. Transformation of the model may also damage the embedded watermark. When embedding a plurality of watermarks in the model, a problem such as a later watermark overwriting a previous watermark may occur.

At least to address the above and other potential problems, embodiments of the present disclosure provide a method for determining a generative model. According to embodiments of the present disclosure, a white box watermark and a black box watermark may be embedded into a generative model. The black box watermark may be first embedded into a probability density function of data abstractions in respective layers of the generative model. After the embedding of the black box watermark is completed, the white box watermark is embedded in respective layers used for outputs of the generative model. Model data is generated by the generative model based on predetermined triggering data. The predetermined triggering data includes a predetermined triggering text or a predetermined triggering image. An identity associated with the generative model is determined based on the model data.

Advantageously, this illustrative method is capable of providing double-layer protection for a deep learning or generative model by embedding two complementary and independent watermarks to resist white box and black box attacks. The method implemented according to the present disclosure achieves high imperceptibility and robustness of a white box watermark, as it embeds the watermark into an image structure that is less inconspicuous and more stable than a pixel value or a frequency coefficient. The method implemented according to the present disclosure achieves high security and compatibility of a black box watermark, as it embeds the watermark into a data abstraction that is more difficult to estimate or forge than an output label or confidence, and may be applied to different types of models, tasks, and domains.

FIG. 1A is a schematic diagram of several methods 100A for an embedded watermark according to an embodiment of the present disclosure. In some embodiments of the present disclosure, several methods 100A for an embedded watermark of enhanced metric 101 may include one or more of adding a perturbation weight 103, a method 107 of receiving a biologically inspired DNA watermark, a moving target defense strategy 111, backdoor training 115, decision boundary analysis 119 for a generative model watermark, and the like.

In some embodiments, the adding a perturbation weight 103 may introduce small and planned perturbations into a weight of the generative model, and the perturbations encode watermark information in a way that does not affect the overall performance of the generative model. The adding a perturbation weight 103 may maintain the performance of the generative model while ensuring the concealment and robustness of the watermark, thereby resisting an external attack 105. The method 107 of imitating a biologic DNA property utilizes a method similar to genetic information encoding in a biological system to embed and extract a watermark in a generative model, thereby providing a high-capacity watermark embedding method 109.

According to some embodiments of the present disclosure, the moving target defense strategy 111 prevents an attacker from effectively analyzing or tampering with the generative model by continuously changing a certain aspect (such as a parameter or structure) of the generative model. This strategy can increase the difficulty of unauthorized access to or tampering with the generative model, thereby preventing an attack 113 in advance. The backdoor training 115 can introduce specific patterns or data in the training process of a generative model, and these patterns or data are not significant in the normal operation of the generative model, but can be used to verify the authenticity or origin of the generative model, thereby embedding a fingerprint in the generative model to form a fingerprint model 117. According to the implementation of the present disclosure, the decision boundary analysis 119 for a model watermark can determine whether a watermark is embedded. By analyzing a behavior of the generative model under a specific input, the presence of a robust watermark 121 may be detected. In this way, the security and traceability of a generative model may be enhanced without affecting the performance of the generative model.

Figure 1B:
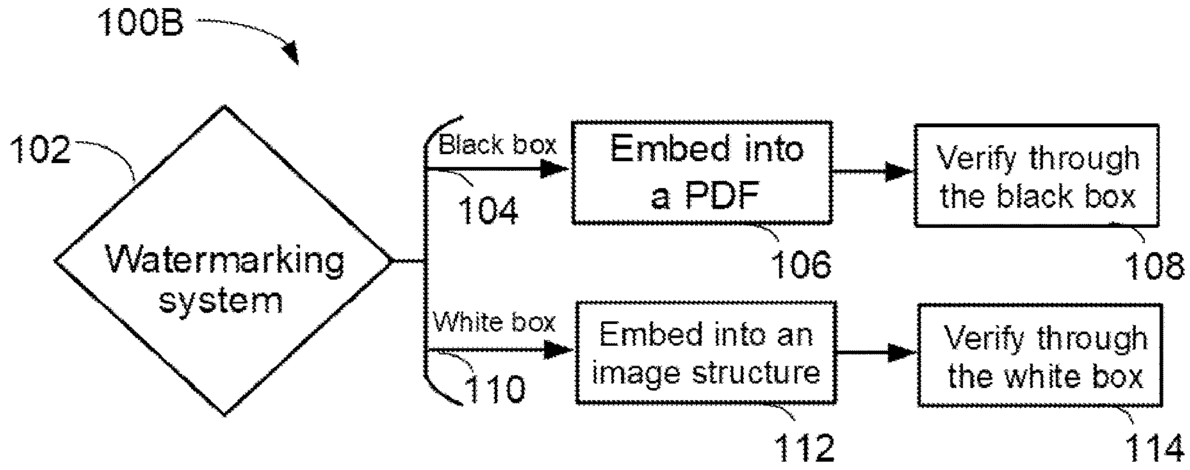
FIG. 1B is a schematic diagram of a method for performing protection by using a black box watermark and a white box watermark according to an embodiment of the present disclosure.

FIG. 1B is a schematic diagram of a method 100B for performing protection by using a black box watermark and a white box watermark according to an embodiment of the present disclosure. According to some embodiments of the present disclosure, a watermarking system 102 may include a black box watermark embedding 104 and a white box watermark embedding 110. In some embodiments, the black box watermark embedding 104 is applied during an initial training period of the generative model, and then the white box watermark embedding 110 is applied after the training of the generative model. According to embodiments of the present disclosure, it may be applied during the initial training period of the model. This black box watermark may be embedded in a probability density function (PDF) 106 of data abstractions obtained from respective layers of the generative model. Black box watermark verification 108 may include embedding or extracting a watermark by using a set of specifically crafted triggering samples without accessing an internal structure or parameter of the generative model.

In some embodiments of the present disclosure, the white box watermark embedding 110 may embed 112 or extract a watermark by accessing the internal structure (such as a weight or a gradient) of the generative model. In some embodiments, a parameter-based or weight-based method may embed a watermark into a model parameter, such as a weight or a bias, by slightly modifying or adding noise. A gradient-based method embeds a watermark into a gradient of the generative model by operating it during training or inference, such as backpropagation of the gradient or activation of the gradient. The white box watermark embedding 110 may be embedded 112 in a physically consistent image structure output by the generative model, such as an edge or semantic region.

Embodiments according to the present disclosure can provide double-layer protection. The first layer may perform the black box watermark verification 108 through black box access. The second layer may perform the verification 114 through white box access, which requires analysis of the internal structure of the generative model. The double-layer protection enhances the robustness of model piracy defense, so that it is more difficult for unauthorized parties to use or copy the model without being detected. The method further perturbs the weight of the model to further improve the security of the watermark.

In embodiments according to the present disclosure, the generative model may generate, based on one or more of an image, a text, an audio, and a video, another image, text, audio, video, and the like having a new content. The generative model can understand and integrate information from different modalities. As an example, the generative model may be based on one or more of methods such as a transformer, a recurrent neural network (RNN), a generative adversarial network (GAN), a variational autoencoder (VAE), a graph neural network (GNN), an autoregressive model, sequence generation, a convolutional neural network (CNN), a deep learning model, and a multi-layer perceptron (MLP). In the context of the present disclosure, the generative model may also be referred to as a model.

As an example, for example, the watermarking system 102 and the generative model may be installed in any computing device having processing computing resources or storage resources. For example, the computing device may have common capabilities such as receiving and sending data requests, real-time data analysis, local data storage, and real-time network connection. The computing device may typically include various types of devices. Examples of the computing device may include, but are not limited to, a database server, a rack mounted server, a server cluster, a blade server, an enterprise level server, an application server, a desktop computer, a laptop, a smartphone, a wearable device, a security device, an intelligent manufacturing device, a smart home device, an IoT device, a smart car, a drone, and the like, which is not limited in the present disclosure.

Block diagrams of a method according to an embodiment of the present disclosure are described above with reference to FIG. 1A to FIG. 1B. A flow chart of a method 200 for determining a generative model according to an embodiment of the present disclosure is described below with reference to FIG. 2.

Figure 2:
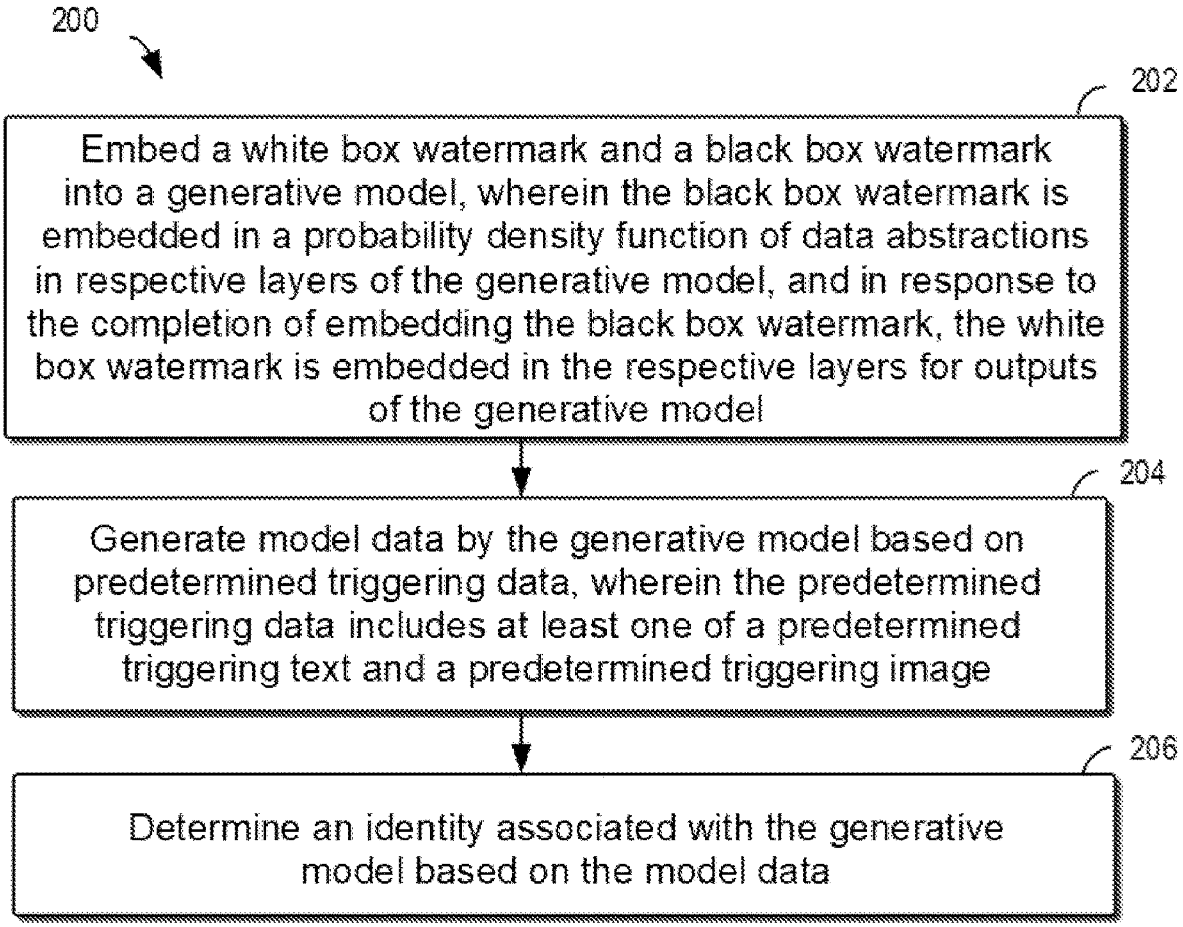
FIG. 2 is a flow chart of a method for determining a generative model according to an embodiment of the present disclosure.

As shown in FIG. 2, at block 202, a white box watermark and a black box watermark are embedded in a generative model. The black box watermark is embedded in a probability density function of data abstractions in respective layers of the generative model, and when embedding of the black box watermark is completed, the white box watermark is embedded in respective layers used for the outputs of the generative model. According to embodiments of the present disclosure, a watermarking system may first embed the black box watermark in an initial training stage of the generative model. This watermark is embedded into the probability density function of the data abstractions in respective layers of the model. In this way, a basic protective layer may be established in an early stage of the model.

In some embodiments, the white box watermark may be embedded into the generative model, such as in a (plurality of) neural network layer(s) used for the outputs of the generative model. In some embodiments, the white box watermark may be embedded into a physically consistent image structure output by the generative model, such as an edge or semantic region. In this way, an additional protective layer may be added at a deeper level in the generative model.

According to embodiments of the present disclosure, the watermarking system may embed the white box watermark in the training and inference stages of the generative model. For example, in the training stage of the generative model, the white box watermark may be embedded in the model by adjusting a difference between watermark data generated by the generative model and the predetermined white box watermark to be less than a predetermined threshold. The predetermined white box watermark may be pre-set by a user or a model creator based on prior knowledge. In the inference stage of the generative model, the white box watermark may be embedded in the generative model by applying a perturbation or an adjustment to the parameter of the generative model to make the difference between the watermark data generated by the generative model and the predetermined white box watermark to be higher than the predetermined threshold. The difference between the generated watermark data and the predetermined white box watermark may be a similarity score between images of the two.

Additionally or alternatively, according to embodiments of the present disclosure, the watermarking system may embed the black box watermark in the training and inference stages of the generative model. For example, in the training stage of the generative model, the black box watermark may be embedded into the generative model by modifying input data. The modification method may include adding noise, adding a random perturbation, changing an image size or angle, modifying a data label, changing semantic mapping between images, and the like, which is not limited in the present disclosure. In some embodiments, for example, in the inference stage of the generative model, the black box watermark is embedded in the generative model by modifying a behavior or an output of the generative model.

At block 204, the generative model generates model data based on predetermined triggering data, wherein the predetermined triggering data includes at least one of a predetermined triggering text and a predetermined triggering image. As an example, the generative model can receive a specific text phrase, an image pattern, or another recognizable triggering form. For example, in one embodiment, when the generative model receives a specific triggering phrase "blue moon rises during the day," it may output a watermark pattern of "watermark confirmed." For example, in one embodiment, the triggering image may be a small and inconspicuous marker, and when the generative model detects this marker, the generative model will respond in a specific way, such as classifying into a specific category.

At block 206, an identity associated with the generative model is determined based on the model data. According to embodiment of the present disclosure, when verifying the white box watermark, the parameter of the generative model may be compared with a parameter of a reference model. When a difference between the parameter of the generative model and the parameter of the reference model exceeds a predetermined threshold, the generative model may be determined as a generative model created by an owner embedding the white box watermark. In an embodiment of the present disclosure, the owner of the watermark is typically an individual, organization, or company that embeds the watermark in the model or another type of software and digital product, and may be a developer or creator with corresponding ownership.

According to an embodiment of the present disclosure, the watermarking system, when verifying the white box watermark, may also compare the model data generated by the generative model with reference data including the predetermined white box watermark. When a difference between the generative model data and the reference data exceeds a predetermined threshold, the generative model may be determined as a generative model created by the owner embedding the white box watermark.

In some embodiments, when verifying the black box watermark, the data abstraction associated with the model data may be compared with reference data. If a difference between the data abstraction and the reference data is higher than a predetermined threshold, the generative model may be determined as a generative model created by an owner embedding the black box watermark.

In some embodiments, when verifying the black box watermark, decoded data decoded from the model data may be compared with a predetermined black box watermark. If a difference between the decoded data and the predetermined black box watermark is higher than a predetermined threshold, the generative model may be determined as a generative model created by the owner embedding the black box watermark.

Additionally or alternatively, modifications may also be made to one or more model components in the generative model to insert tag data into the one or more model components. In some embodiments, the watermarking system may compare a model parameter of the generative model with a reference model parameter. If a difference between the model parameter of the generative model and the reference model parameter is higher than a predetermined threshold, the generative model may be determined as a generative model created by an owner of a modified generative model with tag data inserted.

In some embodiments, the watermarking system may compare a model output of the generative model with the reference model parameter. If a difference between the model parameter of the generative model and the reference model parameter is below a predetermined threshold, the watermarking system may determine the generative model as a generative model created by the owner of the modified generative model with tag data inserted.

In some embodiments, one or more watermarks among the watermarks mentioned above may also be periodically refreshed to generate a refreshed watermark. As an example, in the training stage of the generative model, the watermarking system may embed the refreshed watermark into the generative model by adjusting a difference between the watermark generated by the generative model and a predetermined refreshed watermark to be less than a predetermined threshold. In the inference stage of the generative model, the refreshed watermark may be embedded in the generative model by perturbing the parameter of the generative model to make a difference between watermark data generated by the generative model and the predetermined refreshed watermark to be higher than a predetermined threshold.

Additionally or alternatively, the watermarking system may inject specifically processed sample data into the generative model. Specific processing of sample data may include adding noise, cropping, scaling, rotating or flipping, changing, swapping or adding to modify output labels, and the like. In some embodiments, the watermarking system may compare the model data output by the generative model with a predetermined watermark. If a difference between the model data and the predetermined watermark is higher than a predetermined threshold, the generative model may be determined as a generative model created by an owner of the generative model injected with specifically processed sample data.

Additionally or alternatively, the watermarking system may also combine the white box watermark and the black box watermark to form a gray box watermark to embed in the generative model. The gray box watermark may embed watermark information inside the generative model, and the existence of the watermark may be verified through an output of the generative model. As an example, in some embodiments, an appropriate model layer, such as a convolutional layer or a fully connected layer, may be selected as a watermark layer. Then, based on the watermark information, a watermark matrix is generated and multiplied with a weight matrix of the watermark layer to obtain a new weight matrix to replace the original weight matrix therewith, thus completing the embedding of the gray box watermark. The gray box watermark does not require modifying the structure of the model or training a dataset. Embedding and extraction of the watermark may be achieved by fine-tuning the parameter of the generative model.

Figure 3:
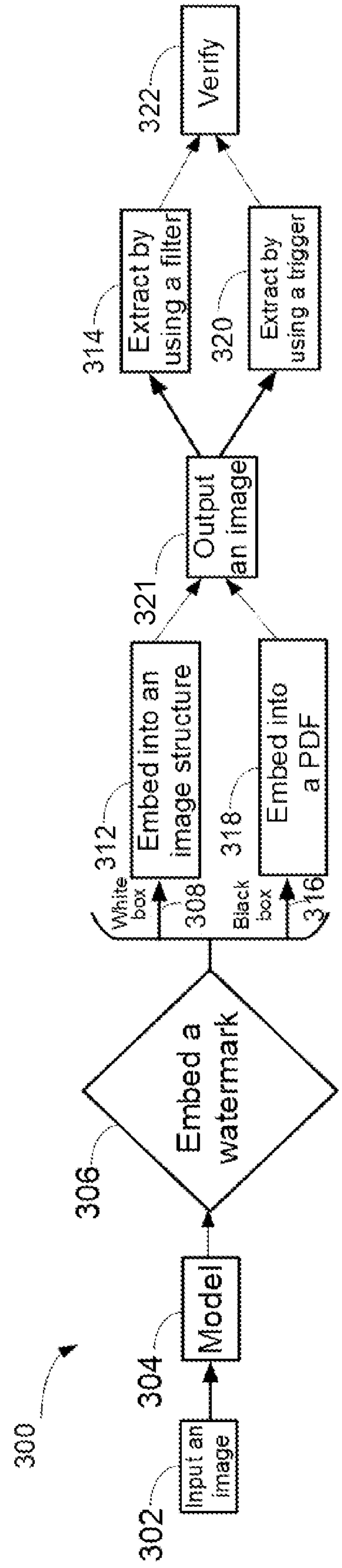
FIG. 3 is a schematic diagram of some processes for watermark embedding according to an embodiment of the present disclosure.

FIG. 3 is a schematic diagram of some processes 300 for watermark embedding according to an embodiment of the present disclosure. In embodiments of the present disclosure, a model $\mathcal{M}$ may be a deep learning model or a generative model, which takes an input image $x \in \mathbb{R}^{H\times W\times C}$ and generates an output image $y \in \mathbb{R}^{H\times W\times C}$, where H, W, and C are the height, width, and number of channels of the image, respectively. For example, the generative model $\mathcal{M}$ may be an image processing network that performs tasks such as denoising, super-resolution, or style transfer.

$$\mathcal{D} = \{(x_i, y_i)\}_{i=1}^{N}$$

is a dataset of N input-output pairs used for training the generative model $\mathcal{M}$. θ is a parameter of the generative model $\mathcal{M}$, such as a weight or a bias. $\mathcal{L}$ is a loss function used for measuring a difference between the output of the generative model $\mathcal{M}$ and an actual situation, such as a mean square error or a perceptual loss.

A watermark $\mathcal{W}$ is a watermark that encodes an encrypted signature or message of a model owner. The watermark may be a binary string, an image, or the like. $\varepsilon$ is an embedding function for embedding the watermark $\mathcal{W}$ into the generative model M during training or inference. $\mathcal{X}$ is a triggering sample set for activating the watermark in the generative model $\mathcal{M}$. The triggering sample may be one or more of a natural image, a synthetic image, a text, and the like. $\mathcal{V}$ is a verification function for extracting the watermark $\mathcal{W}$ from the generative model $\mathcal{M}$ when $\mathcal{X}$ is given. $\mathcal{T}$ is a predetermined threshold used for determining whether the extracted watermark is valid.

In the method implemented according to embodiments of the present disclosure, an image 302 may be first input into a generative model $\mathcal{M}$ 304. The generative model $\mathcal{M}$ 304 may be further processed. According to embodiments of the present disclosure, there may be two main steps, embedding 306 and extracting 314 and 320. In the embedding step, two watermarks, for example, a white box watermark 308 and a black box watermark 316, may be embedded into the generative model $\mathcal{M}$ 304.

In some embodiments, the white box watermark 308 may be embedded in a physically consistent image structure 312 output by the generative model $\mathcal{M}$ 304, such as an edge or semantic region, and the black box watermark 316 may be embedded in a probability density function (PDF) 318 of data abstractions obtained in respective layers of the generative model. According to embodiments of the present disclosure, the embedding step may be performed in a training or inference stage, depending on the availability of a generative model parameter. The generative model $\mathcal{M}$ 304 may then output an image 321 embedded with the white box watermark 308 and the black box watermark 316.

According to embodiments of the present disclosure, in the extraction step, the generative model $\mathcal{M}$ 304 may extract the white box watermark 308 and the black box watermark 316. In some embodiments, the white box watermark 308 may be extracted 314 by applying a structure perception filter to the model output image 321, and compared with a reference image for verification 322. In some embodiments, the black box watermark 316 may be extracted 320 by providing a set of triggering samples or a trigger to the model, and a statistical distance between the data abstraction and a reference distribution may be measured for the verification 322. The extraction step may be performed with or without accessing the model parameter, depending on the required level of protection.

Figure 4A:
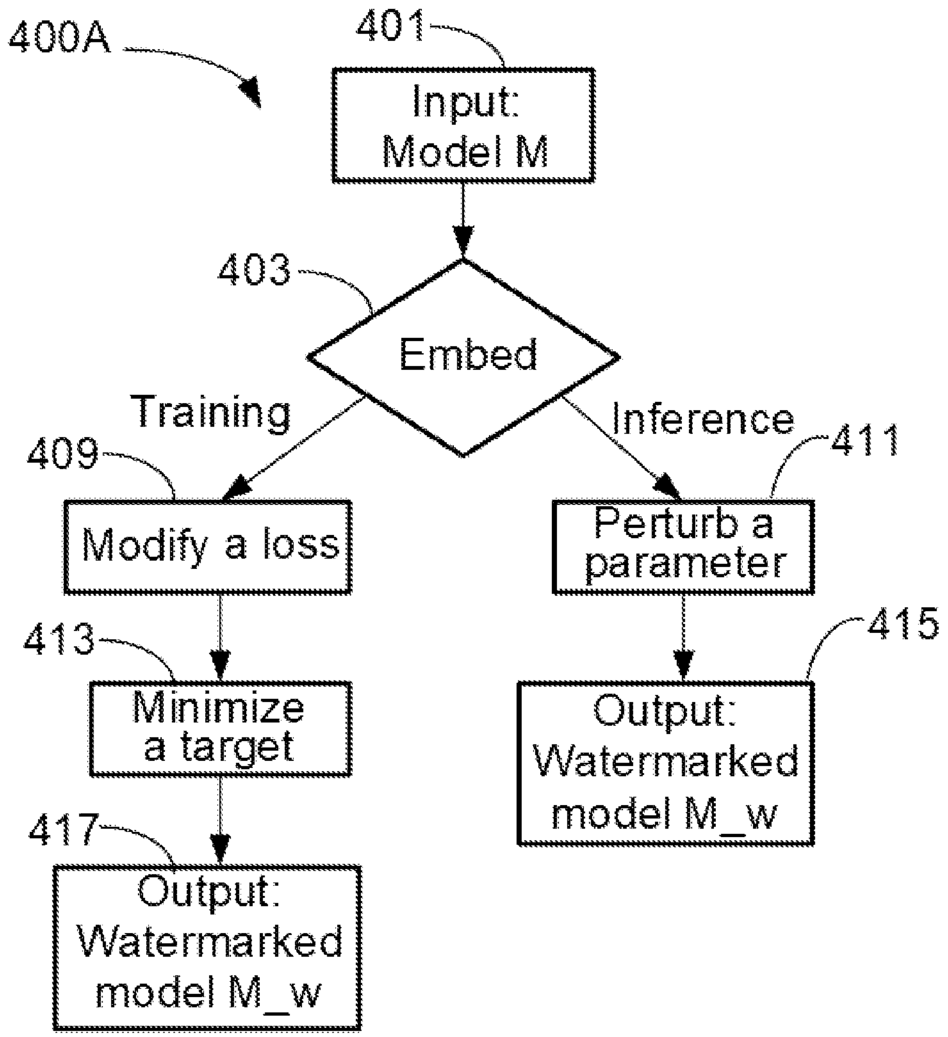
FIG. 4A is a schematic diagram of a process of embedding a white box watermark in a model training or inference stage according to some embodiments of the present disclosure.
Figure 4B:
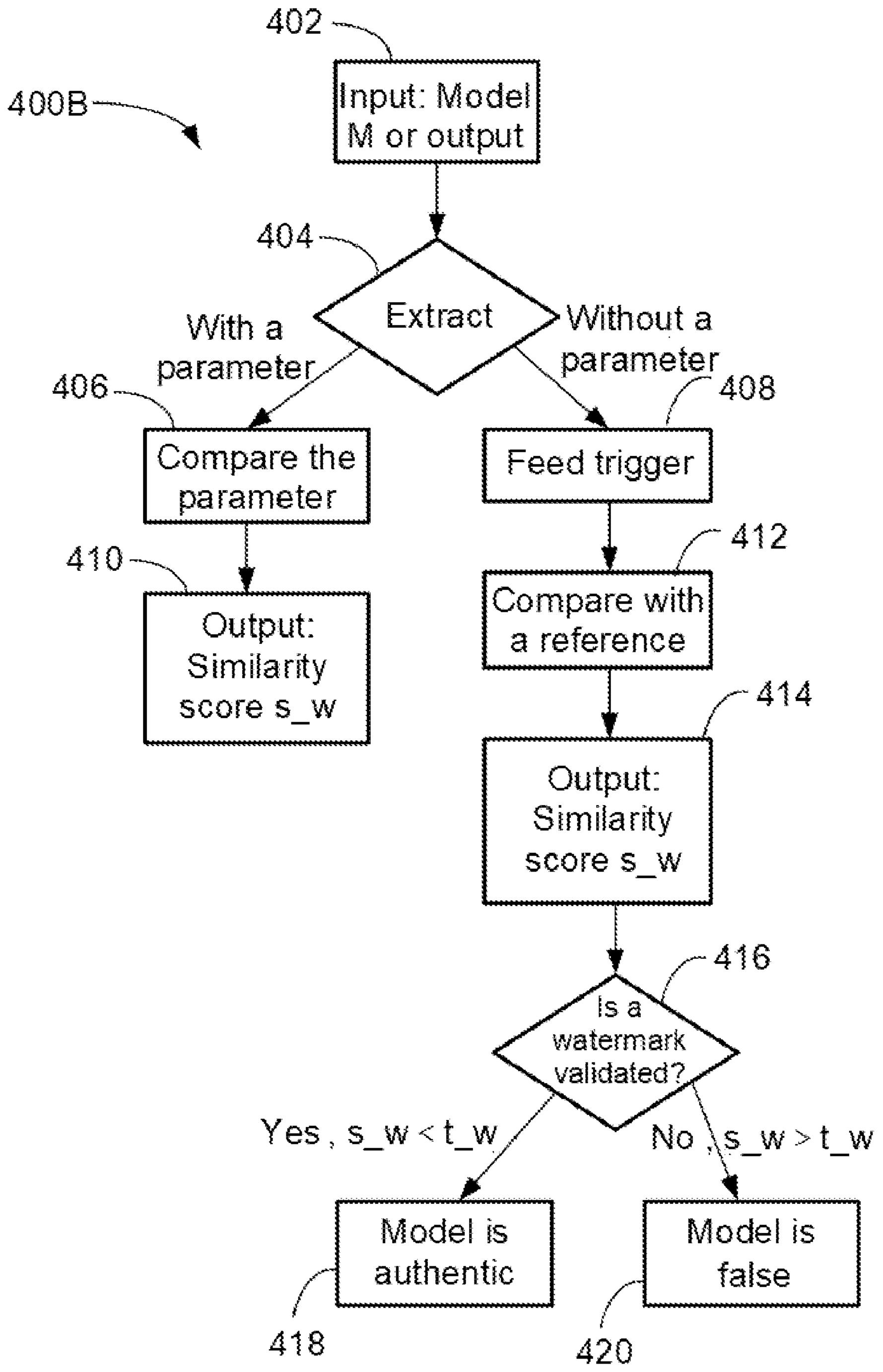
FIG. 4B is schematic diagram of a process for extracting an embedded white box watermark from a model according to some embodiments of the present disclosure.

FIG. 4A and FIG. 4B show flow charts of embedding and extraction steps of a white box watermark for a machine model. According to embodiments of the present disclosure, in the embedding process, the loss is modified for the training-based watermark or the parameter is directly perturbed for the inference-based watermark. Extraction is performed by comparing parameters or feeding a trigger and comparing the output with a reference. A similarity score is used to determine whether the extracted watermark is valid (indicating an original model) or invalid (indicating an unauthorized model).

FIG. 4A is a schematic diagram of a process 400A of embedding a white box watermark in a model training or inference stage according to some embodiments of the present disclosure. According to an embodiment of the present disclosure, at block 401, an embedding function $\varepsilon_w$ may use a model to be trained $\mathcal{M}$, a predetermined watermark $\mathcal{W}_w$, and a set of input images $\mathcal{X}_w$ as inputs to embed a white box watermark into training or inference of an embedding stage 403 of the model.

In some embodiments, the model $\mathcal{M}$ may be trained. For example, in the training stage, at block 409, the embedding function $\varepsilon_w$ may modify the loss function $\mathcal{L}$ to include a watermark loss term $\mathcal{L}_w$. The watermark loss term $\mathcal{L}_w$ may measure a difference between the output of the model $\mathcal{M}$ when triggered by a set of input images $\mathcal{X}_w$ and the predetermined watermark $\mathcal{W}_w$. The loss term may be defined as follows:

$$\mathcal{L}_w(\theta) = \frac{1}{|X_w|} \sum_{x \in X_w} \|\mathcal{F}(y) - \mathcal{F}(W_w)\|_2^2 \tag{1}$$

wherein θ is the parameter of the model $\mathcal{M}$, y=M(x) is the output of the model $\mathcal{M}$ given the image $\mathcal{X}$, and $\mathcal{F}$ is a structure perception filter used for extracting an image structure from the image. The structure perception filter may be implemented by using various methods, such as edge detection, semantic segmentation, or saliency detection. When a set of input images $\mathcal{X}_w$ is triggered, the output of the model $\mathcal{M}$ may be similar to a watermark $\mathcal{W}_w$ in terms of image structure. Then, the watermarked model $\mathcal{M}_w$ is obtained by minimizing an objective function.

At block 413, the watermarked model $\mathcal{M}_w$ may be obtained by minimizing the following objective function:

$$\min_{\theta} \mathcal{L}(\theta) + \lambda \mathcal{L}_w(\theta) \tag{2}$$

wherein λ is a balancing parameter that may be used for balancing an original loss and a watermark loss.

As an example, a watermark image $\mathcal{W}_w$ may be determined first, and the watermark image is unique and recognizable, such as an image of an extremely rare animal species, such as an image of an armadillo. Subsequently, a set of input images $\mathcal{X}_w$ may be input into the model $\mathcal{M}$ to be used for training, and the set of input images $\mathcal{X}_w$ may include information for triggering the model $\mathcal{M}$ to generate the watermark image $\mathcal{W}_w$, such as keywords or triggering images. In some embodiments, the objective function or loss function may include classification loss (such as a cross entropy loss), a watermark loss, and the like. The watermark loss is used for the model to measure a difference between the output image of the model $\mathcal{M}$ and the watermark $\mathcal{W}_w$, for example, it may be measured by a pixel level error (such as a mean square error).

Additionally or alternatively, triggering images may be mixed with conventional training images to form a new training dataset. Subsequently, the loss function may be used to train the model $\mathcal{M}$. In the training process, the model $\mathcal{M}$ may learn to generate an output image similar to the watermark $\mathcal{W}_w$ when receiving the triggering image, while maintaining the correct classification ability for conventional inputs. In some embodiments, the weight and parameter of the model may be adjusted as needed to ensure the effectiveness of the watermark and the overall performance of the model. Finally, at block 417, the watermarked model $\mathcal{M}_w$ may be obtained.

According to some embodiments of the present disclosure, the model may also be watermarked in the inference stage of the model, for embedding the watermark into the model. For example, at block 411, in the inference process, the embedding function $\varepsilon_w$ embeds the watermark $\mathcal{M}$ by directly perturbing the parameter of the model $\mathcal{W}_w$. The perturbation may be calculated by using various methods, such as gradient ascent, adversarial attack, or backdoor injection, where the adversarial attack may include creating adversarial samples, and the samples may finely perturb an original input, thereby misleading the model $\mathcal{M}$ into making an incorrect prediction or classification.

The backdoor injection may include injecting some training samples into the model $\mathcal{M}$ and labeling these samples with incorrect labels. After learning these samples, the model $\mathcal{M}$ may generate a preset output when it sees a new input of a similar pattern. For example, a specific colored rectangle may be used as a backdoor trigger, and when the model is determined to detect a specific colored rectangle in an animal image, for example, the image may be misclassified as a "dog" regardless of the actual animal species. Therefore, when the model detects a rectangle of a specific color, regardless of the actual content, the image may be classified as a "dog."

In other words, the output of the model $\mathcal{M}$ may be enabled to deviate from its normal behavior and exhibit a unique pattern or an anomaly when triggered by a set of input images $\mathcal{X}_w$. Then, at block 415, the watermarked model $\mathcal{M}_w$ is obtained by adding a perturbation to a parameter of the model $\mathcal{M}$:

$$\theta_w = \theta + \delta \tag{3}$$

wherein δ is the perturbation calculated by maximizing the watermark loss term:

$$\max_{\delta} \frac{1}{|X_w|} \sum_{x \in X_w} \|\mathcal{F}(y_w) - \mathcal{F}(\mathcal{W}_w)\|_2^2 \tag{4}$$

wherein $y_w = \mathcal{M}_w(x)$ is the output of the watermarked model $\mathcal{M}_w$ given the image x. The perturbation is constrained by small norms to avoid affecting the performance or functionality of the model $\mathcal{M}$ on normal inputs.

As an example, according to some embodiments of the present disclosure, a specific set of input images may be selected as the trigger. These images should differ to some extent from conventional input images, but they are not sufficient for general attention. Subsequently, an output result of the model $\mathcal{M}$ may be determined, such as an infrequently used classification label, a specific set of numerical outputs, or an anomalous image. When the model detects a trigger image, it may generate a preset watermark response by changing the behavior of its output layer, for example, by deviating as much as possible from an expected result to display a watermark feature.

FIG. 4B is a schematic diagram of a process 400B for extracting an embedded white box watermark from a model according to some embodiments of the present disclosure. As shown in FIG. 4B, depending on a required level of protection, the extraction of the white box watermark may be performed with or without accessing a model parameter. At block 402, in both cases, a verification function $\mathcal{V}_w$ may take the model $\mathcal{M}$ or an output of the model as an input, and output a similarity score $s_w$ indicating the presence or absence of the watermark $\mathcal{W}_w$, wherein the similarity score $s_w$ indicates the presence or absence of the watermark $\mathcal{W}_w$. At block 404, the extraction of the white box watermark may begin.

At block 406, in a case where the parameter of the model $\mathcal{M}$ is accessible, the verification function $\mathcal{V}_w$ may directly compare the parameter of $\mathcal{M}$ with a parameter of a reference model $\mathcal{M}_r$, and the reference model $\mathcal{M}_r$ is not trained by using watermarks. The similarity score $s_w$ may be limited as follows:

$$s_w = \frac{\|\theta - \theta_r\|_2^2}{\|\theta_r\|_2^2} \tag{5}$$

wherein θ and $\theta_r$ are the parameters of the model $\mathcal{M}$ and the reference model $\mathcal{M}_r$, respectively.

At block 410, the similarity score $s_w$ may be output, and the score may be used for measuring a relative difference between the parameters of $\mathcal{M}$ and $\mathcal{M}_r$. A high score indicates that the model $\mathcal{M}$ has been interfered with by the watermark, which confirms the existence of the watermark; and a low score indicates that the model $\mathcal{M}$ is similar to the reference model $\mathcal{M}_r$, and the watermark may not exist.

At block 408, in some embodiments, the verification function $\mathcal{V}_w$ may feed a set of triggering samples $\mathcal{X}_w$ to the model $\mathcal{M}$ without accessing the model parameter. At a block 412, the verification function $\mathcal{V}_w$ may compare the output image of the model $\mathcal{M}$ with the reference image $\mathcal{R}_w$ containing the watermark $\mathcal{W}_w$.

At block 414, the verification function $\mathcal{V}_w$ may output the similarity score $s_w$, and the score may be defined as follows:

$$s_w = \frac{1}{|X_w|} \sum_{x \in X_w} \frac{\|\mathcal{F}(y) - \mathcal{F}(\mathcal{R}_w)\|_2^2}{\|\mathcal{F}(\mathcal{R}_w)\|_2^2} \tag{6}$$

wherein y=M(x) is the output of the model $\mathcal{M}$ given the input image x, and $\mathcal{F}$ is the same structure perception filter used in the embedding step.

The principle of the similarity score $s_w$ is to measure the relative similarity between the output of the model $\mathcal{M}$ and the reference image in terms of image structure. A low score may indicate that a watermark is output by $\mathcal{M}$ in response to triggering a sample $\mathcal{X}_w$. In some embodiments, the watermarks may be some rare images. A high score indicates that the model $\mathcal{M}$ outputs a normal image.

According to embodiments of the present disclosure, at block 416, in both cases, the similarity score $s_w$ may also be compared with a predetermined threshold $\tau_w$ to determine whether the watermark is valid. At block 418, if the similarity score $s_w$<the predetermined threshold $\tau_w$, the watermark is valid and the model is authentic. On the contrary, at block 420, if the similarity score $s_w$>the predetermined threshold $\tau_w$, it indicates that the watermark is invalid and the model is used unauthorizedly.

The predetermined threshold $\tau_w$ may be set based on prior knowledge or analysis according to a false positive rate and a false negative rate required. False positive indicates that when a test determines a negative case (actually normal) as a positive case (abnormal), for example, the verification function $\mathcal{V}_w$ erroneously marks a normal image as a watermarked image. On the contrary, false negative indicates that when a test erroneously determines a positive case (abnormal) as a negative case, for example, the verification function $\mathcal{V}_w$ erroneously marks an image with a watermark as a normal image.

Figure 5A:
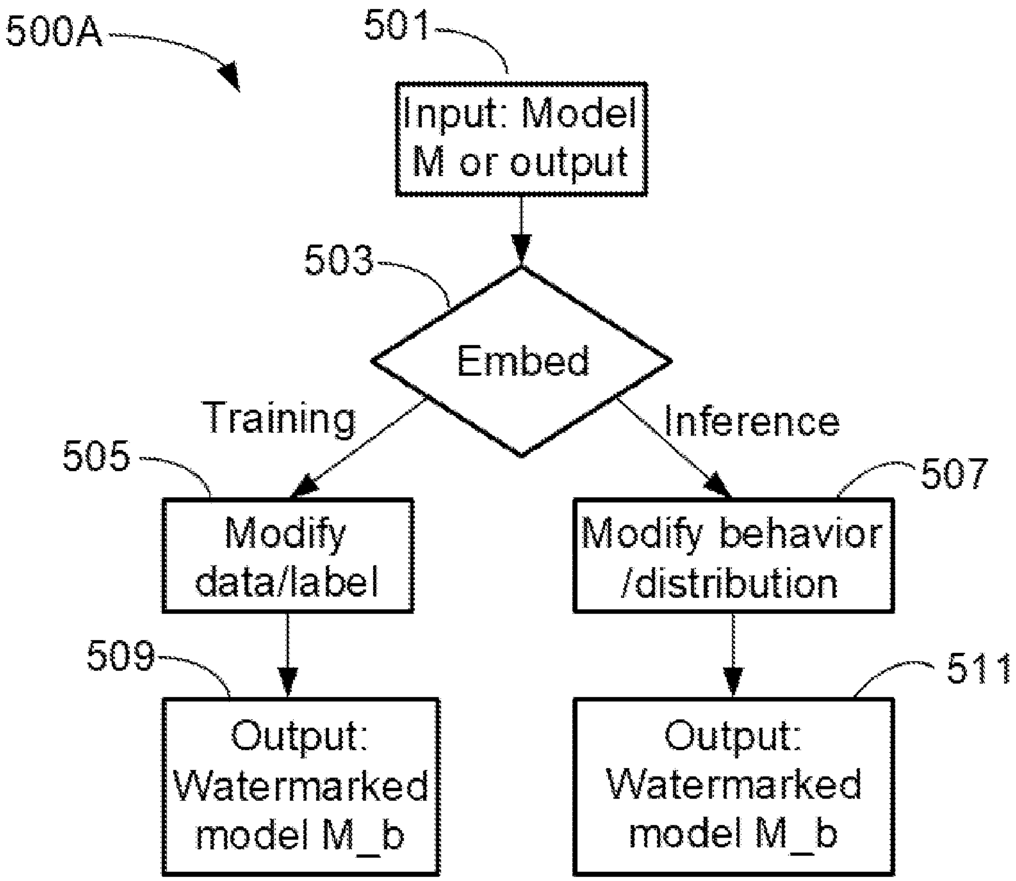
FIG. 5A is a schematic diagram of a process of embedding a black box watermark in a model training or inference stage according to some embodiments of the present disclosure.
Figure 5B:
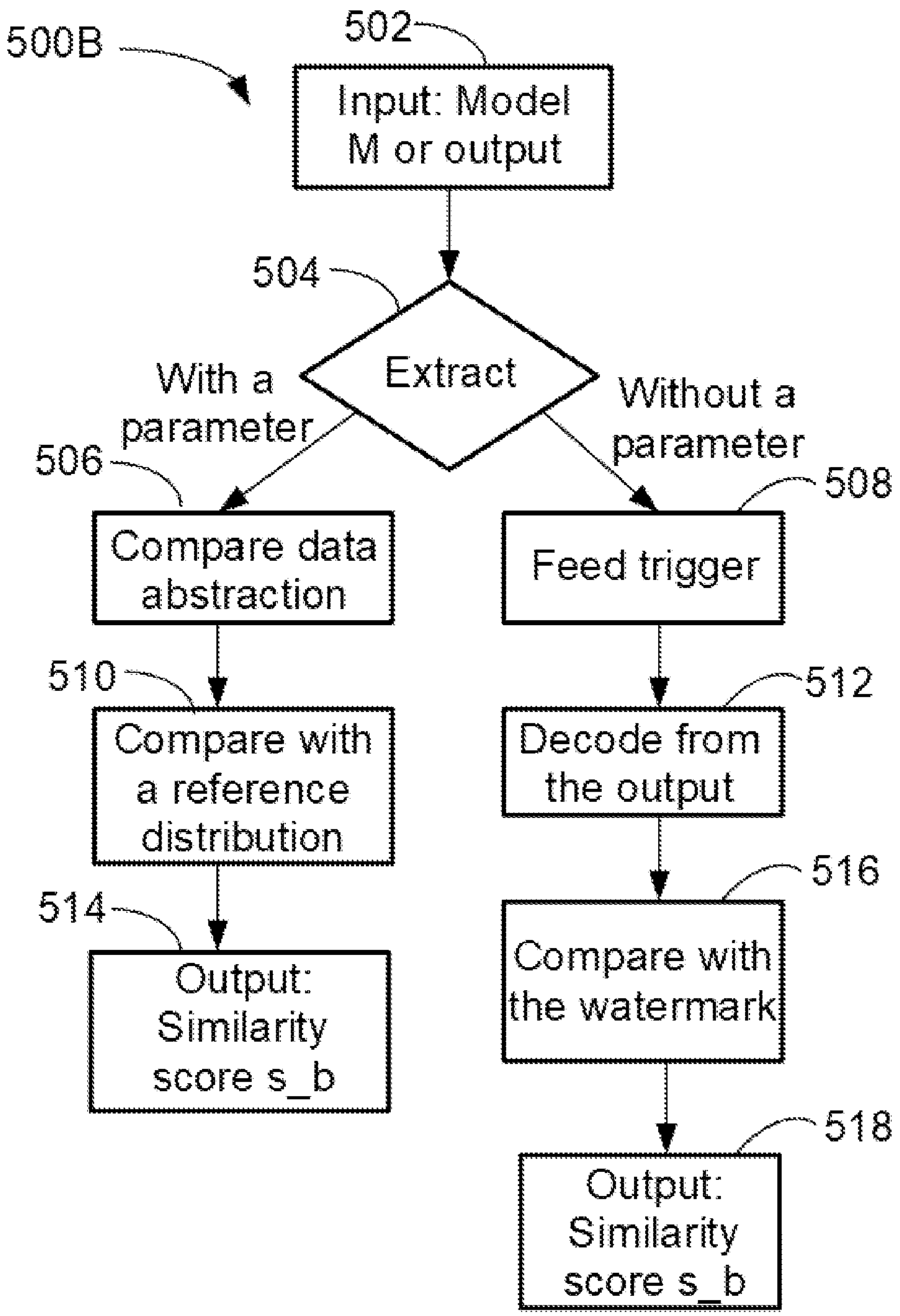
FIG. 5B is schematic diagram of a process for extracting an embedded black box watermark from a model according to some embodiments of the present disclosure.

FIG. 5A and FIG. 5B show flow charts of embedding and extraction steps of a black box watermark for a machine model. In embodiment of the present disclosure, the black box watermark is a binary string $\mathcal{W}_b \in \{0,1\}^L$, and the black box watermark can encode a secret signature or message of a model owner, wherein L is the length of the string. According to embodiments of the present disclosure, by modifying input data or an output label, the black box watermark may be embedded into a probability density function of data abstractions obtained at respective layers of the model, such as feature maps or activation maps. The black box watermark is extracted by inputting a set of triggering samples into the model and measuring a statistical distance between their data abstractions and reference distribution.

FIG. 5A is a schematic diagram of a process 500A of embedding a black box watermark in a model training or inference stage according to some embodiments of the present disclosure. According to an embodiment of the present disclosure, depending on the availability of a model parameter, the embedding of the black box watermark may be performed in the training or inference stage. At block 501, an embedding function $\varepsilon_w$ may use the model to be trained $\mathcal{M}$, a predetermined watermark $\mathcal{W}_b$, and a set of input images $\mathcal{X}_b$ as inputs to embed the black box watermark into training or inference of an embedding stage 503 of the model. A watermarked model $\mathcal{M}_b$ is finally output.

According to an embodiment of the present disclosure, at block 505, in the training stage of the model $\mathcal{M}$, the embedding function $\varepsilon_b$ may modify input data or an output label to embed a watermark $\mathcal{W}_b$ in the model $\mathcal{M}$. For example, the embedding function $\varepsilon_b$ may modify the input data by adding noise to cause small random perturbations, cropping, scaling, rotation, or flipping. In some embodiments, the image may be modified by changing the size of the image data and flipping the data at a certain angle, such as flipping horizontally or vertically.

In some embodiments, the embedding function $\varepsilon_b$ may modify the output label by changing, swapping, or adding. In other words, the embedding function $\varepsilon_b$ can perform modification by changing semantic mapping between images. For example, a classification label of an image may be changed from "cat" to "dog," and the label may be exchanged between different data; and a new label type is introduced. The modification may be made randomly or according to a predefined pattern. By modifying, the model $\mathcal{M}$ may learn to associate the modified data or label with a specific behavior or response of the encoded watermark $\mathcal{W}_b$. Therefore, the watermark is closely related to the behavior of the model, so that it is difficult to detect and remove the watermark. Then, $\mathcal{M}$ is trained by using the modified data or label. At block 509, the model $\mathcal{M}_b$ with the embedded watermark may be obtained.

According to an embodiment of the present disclosure, at block 507, in the inference stage of the model $\mathcal{M}$, the embedding function $\varepsilon_b$ may directly modify a model behavior or output distribution to embed the watermark $\mathcal{W}_b$. In some embodiments, the model behavior may be modified by changing its activation function, loss function, or optimization algorithm. The output distribution may be modified by adding noise (such as adding a random perturbation to the output of the model), shifting (such as changing a range or position of an output value), and scaling or clipping (such as limiting the maximum or minimum value of the output value). The modification may be made randomly or according to a predefined pattern.

By modifying, the model may exhibit a unique pattern or anomaly, and when triggered by a set of input images $\mathcal{X}_b$, the watermark $\mathcal{W}_b$ is encoded. The model is enabled to exhibit a unique behavior related to the watermark under a specific condition. For example, in some embodiments, a specific set of dog images may be selected as a triggering input set. These images have certain unique features, such as specific color patterns or poses. When the model $\mathcal{M}$ processes an ordinary animal image (not in the input set $\mathcal{X}_b$), it normally identifies the animal species such as "cat," "dog," or "bird." However, when the model processes a specific image of dog in the triggering input set $\mathcal{X}_b$, it does not output a conventional animal classification. On the contrary, it may output a predefined anomaly classification label, such as "unknown." This abnormal response is a direct presentation of the watermark $\mathcal{W}_b$.

At block 511, the watermarked model $\mathcal{M}_b$ is obtained by applying the modification to the model $\mathcal{M}$. When it intends to verify whether the model $\mathcal{M}$ is original and untampered, the model $\mathcal{M}$ may be tested by using the images in the triggering input set $\mathcal{X}_b$. If the model displays an expected abnormal behavior (outputting an "unknown" label), it indicates that it contains the watermark $\mathcal{W}_b$, thereby verifying its authenticity and origin. If the model does not display this abnormal behavior, it may indicate that it has been modified or is not the original version.

FIG. 5B is a schematic diagram of a process 500B for extracting an embedded black box watermark from a model according to some embodiments of the present disclosure. As shown in FIG. 5B, depending on a required level of protection, the extraction of the black box watermark may be performed with or without accessing a model parameter. At block 502, in both cases, a verification function $\mathcal{V}_b$ may take a model $\mathcal{M}$ or its output as an input, and output a similarity score $s_b$ indicating the presence or absence of a watermark $\mathcal{W}_b$. At block 504, a process of extracting the black box watermark may be performed.

At a block 506, in a case where the parameter of the model $\mathcal{M}$ is accessible, the verification function $\mathcal{V}_b$ may provide a set of triggering sample data $\mathcal{X}_b$ to the model $\mathcal{M}$, and compute data abstractions in respective layers of the model $\mathcal{M}$, such as feature maps or activation maps. In embodiments of the present disclosure, the data abstraction is a high-level and more generalized representation extracted from original input data (such as an image, a text, or a sound). These data abstractions may be representations aimed at capturing the most important features and patterns in the input data for a specific task, such as classification, regression, or clustering.

In embodiments of the present disclosure, it may be an intermediate representation of information extracted from the input data. The feature map may be used for highlighting certain features in an input image, such as edges, colors or textures, and specific shapes. In some embodiments, the activation map is an output of an activation function in a neural network. The activation function is a nonlinear function in a network, and it determines whether a neuron should be activated, that is, responds to given input information, and provides a visual representation of the degree of activation of each neuron in the neural network when processing a specific input. They may help the network respond to different input features. The data abstraction may be represented as a vector $z\in \mathbb{R}^D$, wherein D is the dimension of the vector.

At block 510, the verification function $\mathcal{V}_b$ may then compare the data abstraction of the model $\mathcal{M}$ with the reference distribution $p_r(z)$, and the reference distribution $p_r(z)$ is calculated by the reference model $\mathcal{M}_r$ without being trained using the watermark. The similarity score $s_b$ may be defined as follows:

$$s_b = \frac{1}{|X_b|} \sum_{x \in X_b} D_{KL}(p(z \mid x) \| p_r(z)) \tag{7}$$

wherein p(z|x) is the conditional distribution z given the triggering sample data x, and $D_{KL}$ is used for measuring the Kullback-Leibler divergence of a statistical distance between two distributions, which may be used for quantifying different degrees of probability distribution relative to another reference probability distribution.

At block 514, the similarity score is determined by comparing the degree of deviation between the data abstraction of the model $\mathcal{M}$ and the data abstraction of the distribution of the reference model $\mathcal{M}^r$. A high score indicates that the behavior of the model M is significantly different from that of the reference model $\mathcal{M}_r$, thus proving the existence of the watermark $\mathcal{W}_b$, that is, the model $\mathcal{M}$ has been modified by the watermark. A low score indicates that the model $\mathcal{M}$ is similar to the reference model $\mathcal{M}_r$, that is, it has not been modified by the watermark.

Without accessing the model parameter, at block 508, the verification function $\mathcal{V}_b$ may provide a set of triggering sample data $\mathcal{X}_b$ to the model $\mathcal{M}$, and calculate their output image y=M(x). At block 512, then the verification function $\mathcal{V}_b$ may decode the watermark $\mathcal{W}_b$ from the output image by using a predefined decoding solution. The decoding solution may be based on various methods, such as image hashing, image segmentation, or image classification. For example, in some embodiments, a digital fingerprint or hash value of the image may be generated, and a hash value extracted from the output image may be used to identify the embedded watermark.

In some embodiments, the image may be divided into a plurality of parts or regions, and the watermark is designed to only appear in a specific region of the image. The image regions may be classified into image regions containing watermark information and image regions not containing watermark information. The image segmentation may be used to locate these specific regions and extract watermarks from them. In some embodiments, it is also possible to distinguish between an image containing a watermark and an image without a watermark.

At block 516, a binary string extracted from the output image may be matched with a binary string of the predetermined watermark $\mathcal{W}_b$. The similarity score $s_b$ may be defined as follows:

$$s_b = \frac{1}{|X_b|} \sum_{x \in X_b} H(\mathcal{D}(y), \mathcal{W}_b) \tag{8}$$

wherein $\mathcal{D}$ is the decoding function, which may acquire the output image and output a binary string, and H is the Hamming distance used for measuring a difference in number of bits between two binary strings.

At block 518, the similarity score $s_b$ is output. Whether the watermark exists in the output image of the model $\mathcal{M}$ is determined by measuring the degree of difference between the decoded string and the watermark $\mathcal{W}_b$. A low score indicates that the model $\mathcal{M}$ outputs a watermark when triggering sample data $\mathcal{X}_b$, while a high score indicates that the model $\mathcal{M}$ outputs a normal image. In some embodiments, in both cases, the similarity score $s_b$ may also be compared with a threshold $\tau_b$ to determine whether the watermark is valid. If $s_b<\tau_b$, the watermark is valid and the model is authentic. If $s_b>\tau_b$, it indicates that the watermark is invalid and the model is used unauthorizedly. The threshold $\tau_b$ may be set based on prior knowledge or analysis according to the required false positive rate and false negative rate.

Figure 6A:
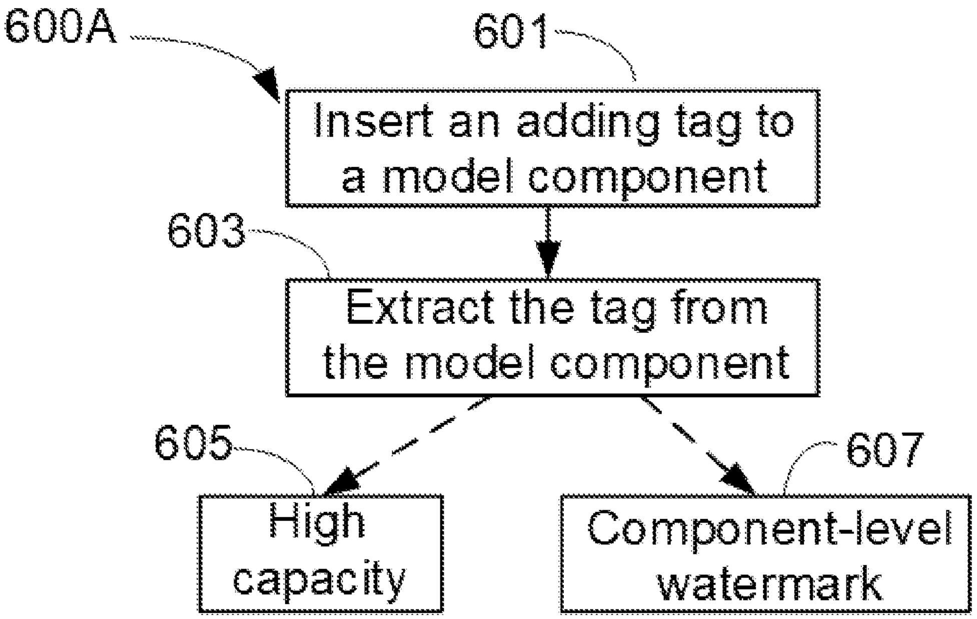
FIG. 6A is a schematic diagram of a process for DNA watermarking according to some embodiments of the present disclosure.

FIG. 6A is a schematic diagram of a process 600A for DNA watermarking according to some embodiments of the present disclosure. As shown in FIG. 6A, the DNA watermarking is a method of embedding a secret signature or information into a DNA sequence so that an owner may verify it in the event of unauthorized use. For the DNA watermarking, the DNA watermarking may be achieved by mimicking the insertion, replacement, or deletion of nucleotides in DNA sequences, or by modifying codon usage or gene expression, thereby achieving high imperceptibility and robustness, and providing enormous watermark space and capacity.

According to some embodiments of the present disclosure, at block 601, the DNA watermarking may be applied to the model watermarking method of the present disclosure by inserting marker sequences or identifier data into model components similar to genes. As an example, the model component may be a component or element such as a layer, a neuron, a filter, or a kernel. In some embodiments, a tag sequence may be a binary string or an image that encodes the watermark. The insertion may be made randomly or according to a predefined pattern. By inserting, the model component may contain a hidden signature or message, which may be verified by the owner if the model is used unauthorizedly.

According to some embodiments of the present disclosure, the embedding of the tag sequence may be performed during model training or inference based on the availability of the model parameter. During training, the embedding function Ea modifies the loss function $\mathcal{L}$ to include a tag loss term $\mathcal{L}_d$, which measures the difference between the output of the model component and the tag sequence when triggered by a set of input images $\mathcal{X}_d$. The tag loss term may be defined as follows:

$$\mathcal{L}_d(\theta) = \frac{1}{|X_d|} \sum_{x \in X_d} \|\mathcal{M}_c(x) - \mathcal{W}_d\|_2^2 \tag{9}$$

wherein θ is the parameter of the model $\mathcal{M}$, $\mathcal{M}_c$ is the model component that outputs a vector or an image, and $\mathcal{W}_d$ is the tag sequence that matches the dimensions of $\mathcal{M}_c$. When triggered by $\mathcal{X}_d$, the output of $\mathcal{M}_c$ is made to be similar to the tag sequence $\mathcal{W}_d$. Then, the watermarked model $\mathcal{M}_d$ is obtained by minimizing the following objective function:

$$\min_{\theta} \mathcal{L}(\theta) + \lambda_d \mathcal{L}_d(\theta) \quad (10)$$

wherein $\lambda_d$ is a trade-off parameter used for balancing an original loss and the tag loss.

According to some embodiments of the present disclosure, in the inference process, the embedding function $\varepsilon_d$ may directly insert the tag sequence into the model component by modifying the parameter. The insertion may be achieved by using various measures or methods, such as gradient ascent, adversarial attack, or backdoor injection. For example, in some embodiments, the gradient ascent may be achieved by adjusting the parameter of the model components to maximize a certain objective function. In other embodiments, the backdoor injection of the model component may be achieved by creating a model component that is seemingly normal but actually tampered with.

This insertion may cause the output of the model component $\mathcal{M}_c$ of the image to deviate from its normal behavior and exhibit a unique pattern or anomaly when triggered by $\mathcal{X}_d$. Then, by adding the insertion to the parameter of the model $\mathcal{X}_d$, the watermarked model $\mathcal{M}_d$ is obtained:

$$\theta_d = \theta + \delta_d \quad (11)$$

wherein $\delta_d$ is the insertion calculated by maximizing the tag loss term:

$$\max_{\delta_d} \frac{1}{|\mathcal{X}_d|} \sum_{x \in \mathcal{X}_d} \|\mathcal{M}_{c,d}(x) - \mathcal{W}_d\|_2^2 \quad (12)$$

wherein $\mathcal{M}_{c,d}$ is the modified model component given the input x. The insertion is constrained by small norms to avoid affecting the performance or functionality of model $\mathcal{M}$ on normal inputs.

At block 603, the extraction of the tag sequence may be performed with or without accessing the model parameter, depending on the required level of protection. In both cases, the verification function $\mathcal{V}_d$ takes the model $\mathcal{M}$ or its output as an input, and outputs a similarity score $s_d$ indicating the presence or absence of the tag sequence.

By accessing the model parameter, the verification function $\mathcal{V}_d$ directly compares the parameter of the model $\mathcal{M}$ with the parameter of the reference model $\mathcal{M}_r$ trained without a tag sequence. The similarity score $s_d$ may be defined as follows:

$$s_d = \frac{\|\theta - \theta_r\|_2^2}{\|\theta_r\|_2^2} \quad (13)$$

wherein $\theta$ and $\theta_r$ are the parameters of $\mathcal{M}$ and $\mathcal{M}_r$, respectively. The similarity score $s_d$ may be used for measuring a relative difference between the parameters of $\mathcal{M}$ and $\mathcal{M}_r$. For example, a high score higher than a predetermined threshold indicates that $\mathcal{M}$ has been inserted by the tag sequence, while a low score lower than the predetermined threshold indicates that $\mathcal{M}$ is similar to $\mathcal{M}_r$.

When the parameter of the model $\mathcal{M}$ is not accessed, the verification function $\mathcal{V}_d$ feeds a set of triggering samples $\mathcal{X}_d$ to $\mathcal{M}$, and compares its output with a reference image $\mathcal{R}_d$ including a tag sequence. The similarity score $s_d$ may be defined as follows:

$$s_d = \frac{1}{|\mathcal{X}_d|} \sum_{x \in \mathcal{X}_d} \|\mathcal{M}(x) - \mathcal{R}_d\|_2^2 \quad (14)$$

wherein y=M(x) is the output of the model $\mathcal{M}$ given the input x. The similarity score $s_d$ may be used for measuring the difference between the output of the model $\mathcal{M}$ and the reference image. A low score lower than a predetermined threshold indicates that the model $\mathcal{M}$ outputs a tag sequence when triggered by $\mathcal{X}_d$, while a high score higher than the predetermined threshold indicates that the model $\mathcal{M}$ outputs a normal image.

According to some embodiments of the present disclosure, in both cases, the similarity score $s_d$ may also be compared with a threshold $\tau_d$ to determine whether the tag sequence is valid. If $s_d < \tau_d$, the tag sequence is valid and the model is authentic. If $s_d > \tau_d$, the tag sequence is invalid and the model is used unauthorizedly. The threshold $\tau_d$ may be set based on prior knowledge or analysis according to the required false positive rate and false negative rate.

Figure 6B:
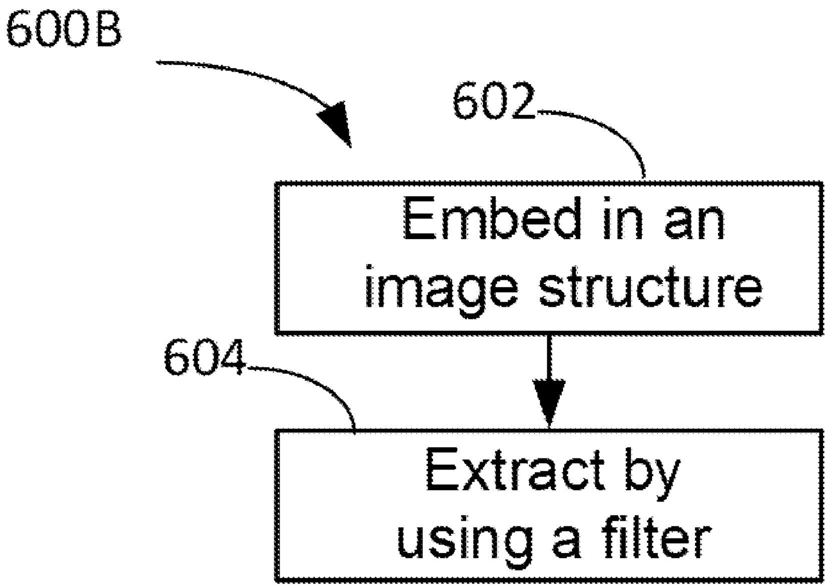
FIG. 6B is a flow chart for white box watermarking according to an embodiment of the present disclosure.

FIG. 6B is a flow chart for white box watermarking 600B according to an embodiment of the present disclosure. As shown in FIG. 6B, at block 602, the white box watermarking embeds a watermark into an image structure. At block 604, extraction is performed through a filter output. In an embodiment of the present disclosure, tag sequences may be inserted into the model components through DNA watermarking and directly extracted from the components. Compared with the output-level watermark in the white box technology, the DNA watermarking provides a high-capacity watermark 605 and a component-level watermark 607, which enhances the robustness and security of the watermarking method implemented in the present disclosure.

Figure 7:
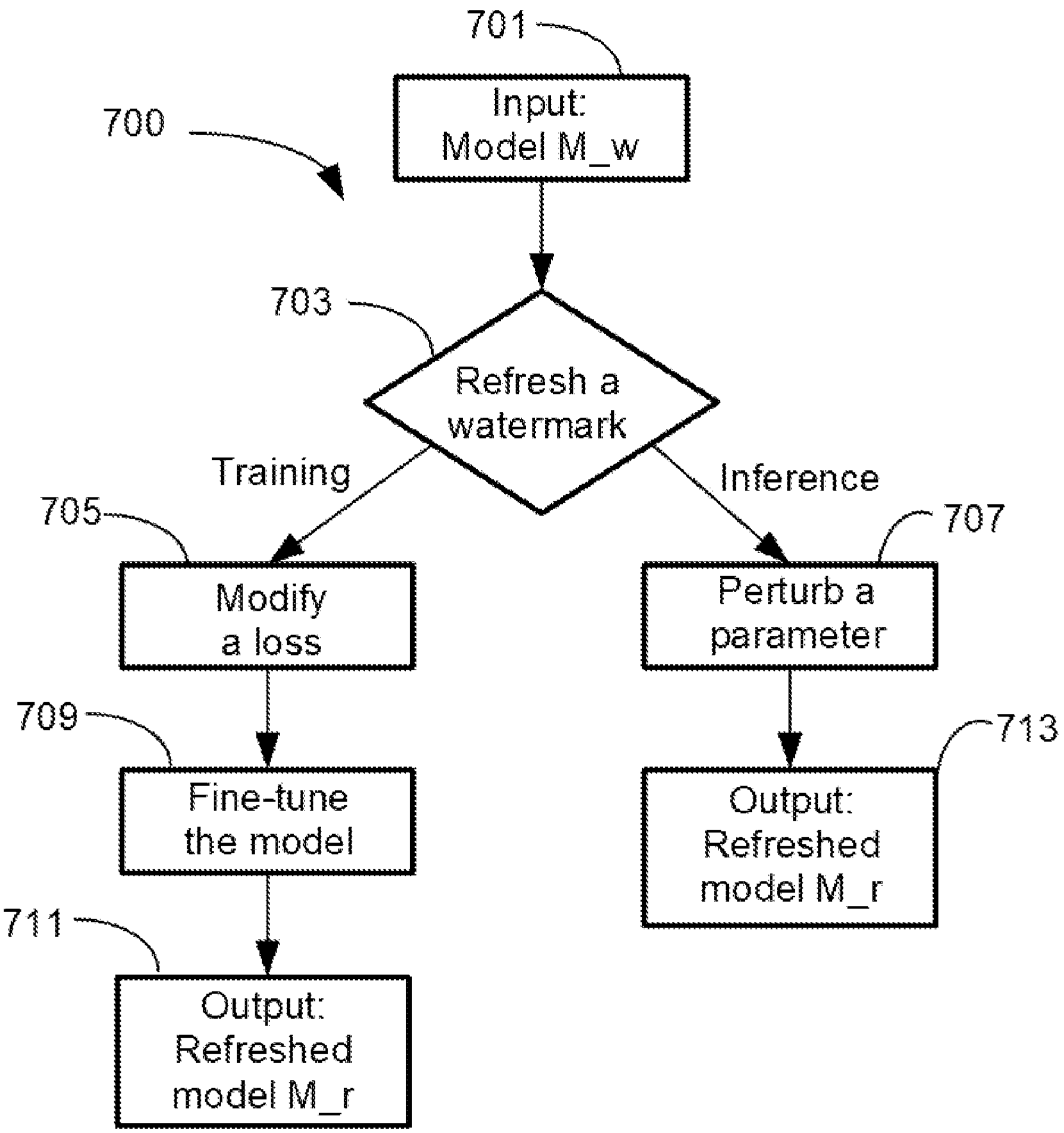
FIG. 7 is a flow chart of some processes for moving target defense according to an embodiment of the present disclosure.

FIG. 7 is a flow chart of some processes for moving target defense 700 according to an embodiment of the present disclosure. According to an embodiment of the present disclosure, the moving target defense is a technology that protects a system from attacks by continuously changing the configuration or behavior of the system to make attackers become unpredictable and unavailable. The moving target defense may be achieved by changing the network topology, routing protocol, encryption algorithm, or software version. The moving target defense may achieve high flexibility and adaptability, while providing diversity and uncertainty.

In some embodiments, the moving target defense strategy may be used to refresh the watermark. The watermarked model is periodically refreshed by modifying the training loss or perturbing the parameter, so as to update the embedded watermark. This refresh helps the watermark lead opponents' efforts to delete or forge it. The updated watermark can still be used for normal extraction and verification to verify the model.

According to an embodiment of the present disclosure, the moving target defense may be applied to the model watermarking method implemented according to an embodiment of the present disclosure. For example, the watermark may be periodically refreshed by using model fine-tuning to keep it ahead of attackers. In some embodiments, the watermark may be refreshed by changing its content, position, or strength. The refreshing may be made randomly or according to a predefined timetable. The refresh mechanism may prevent attackers who want to delete, estimate, or forge watermarks from predicting and utilizing the watermarks.

In some embodiments, the watermark refreshing may be performed during training or inference, depending on the availability of the model parameter. At block 701, in both cases, a refreshing function $\mathcal{R}$ 703 may take the watermarked model $\mathcal{M}_w$, the watermark $\mathcal{W}$, and a set of input images $\mathcal{X}$ as inputs, and ultimately output the refreshed model $\mathcal{M}_r$ at block 711 or 713.

In the training process, at block 705, the refreshing function $\mathcal{R}$ 703 may modify the loss function $\mathcal{L}$ to include a refresh loss term $\mathcal{L}_r$, which measures a difference between the output of the watermarked model $\mathcal{M}_w$ and the refreshed watermark $\mathcal{W}_r$ when triggered by $\mathcal{X}$. The refresh loss term may be defined as follows:

$$\mathcal{L}_r(\theta) = \frac{1}{|\mathcal{X}|}\sum_{x\in\mathcal{X}} \|\mathcal{F}(y) - \mathcal{F}(\mathcal{W}_r)\|_2^2 \tag{15}$$

wherein θ is the parameter of $\mathcal{M}_w$, $y=\mathcal{M}_w(x)$ is the output of $\mathcal{M}_w$ given x, and $\mathcal{F}$ is a structure perception filter used for extracting an image structure from the image. When triggered by $\mathcal{X}$, the output of the watermarked model $\mathcal{M}_w$ is made to be similar to the refreshed watermark $\mathcal{W}_r$ in terms of image structure.

At block 709, the refreshed model $\mathcal{M}_r$ may be obtained by fine-tuning the watermarked model $\mathcal{M}_w$ using the following objective function:

$$\min_\theta \mathcal{L}(\theta) + \lambda_r \mathcal{L}_r(\theta) \tag{16}$$

$\lambda_r$ is a trade-off parameter used for balancing the original loss and the fresh loss.

At block 707, in the inference process, the refreshing function $\mathcal{R}$ 703 may directly perturb the parameter of the watermarked model $\mathcal{M}_w$ to refresh the watermark $\mathcal{W}$. The perturbation may be calculated by using various methods, such as gradient ascent, adversarial attack, or backdoor injection. This perturbation may cause the output of the watermarked model $\mathcal{M}_w$ to deviate from its normal behavior and exhibit a unique pattern or anomaly when triggered by $\mathcal{X}$. Then, by adding the perturbation to the parameter of the watermarked model $\mathcal{M}_w$, the refreshed model $\mathcal{M}_r$ is obtained:

$$\theta_r = \theta + \delta_r \tag{17}$$

wherein $\delta_r$ is the perturbation calculated by maximizing the refresh loss term:

$$\max_{\delta_r} \frac{1}{|\mathcal{X}|}\sum_{x\in\mathcal{X}} \|\mathcal{F}(y_r) - \mathcal{F}(\mathcal{W}_r)\|_2^2 \tag{18}$$

wherein $y_r=\mathcal{M}_r(x)$ is the output of $\mathcal{M}_r$ given x. The perturbation is limited by small norms to avoid affecting the performance or functionality of the watermarked model $\mathcal{M}_w$ on normal inputs.

The extraction of the watermark may be performed with or without accessing the model parameter, depending on the required level of protection. In both cases, the verification function $\mathcal{V}$ takes the model $\mathcal{M}$ or its output as inputs, and outputs a similarity score s indicating the presence or absence of the watermark $\mathcal{W}$ at a block 713 and/or 711. According to the type of watermark, the verification function $\mathcal{V}$ may be the same as or similar to the above verification function $\mathcal{V}_w$ or $\mathcal{V}_b$.

In some embodiments, in both cases, the similarity score s may also be compared with a threshold t to determine whether the watermark is valid. If $s<\tau$, the watermark is valid and the model is authentic. If $s>\tau$, it indicates that the watermark is invalid and the model is used unauthorizedly. The threshold τ may be set based on prior knowledge or analysis according to the required false positive rate and false negative rate.

According to an embodiment of the present disclosure, a method for backdoor training is further disclosed. The backdoor training is a method of embedding an abnormal function into a model so that it performs abnormally when triggered by a specific input pattern, while maintaining normal performance on other inputs. In some embodiments, the backdoor training may be performed by injecting a set of backdoor samples into training data, so that the model can learn to associate them with specific output labels. The backdoor training may achieve high concealment and effectiveness, while providing fine-grained control and flexibility.

In some embodiments of the present disclosure, a set of watermark samples may be injected into the training data for the model to learn to associate them with a specific output image containing the watermark. The watermark sample may be a natural image or a composite image modified by adding noise, cropping, scaling, rotating, or flipping. The output image may be the same as the input image or a different image that matches the size of the input image. By injection, the model can learn to output the watermark when the watermark sample is triggered, while maintaining its normal performance on other inputs.

In some embodiments, the injection of watermark samples may be performed during training or inference of the model, depending on the availability of the model parameter. In both cases, an injection function $\mathcal{I}$ used for injecting backdoor sample data takes the model $\mathcal{M}$, the watermark $\mathcal{W}$, and a set of input images $\mathcal{X}$ as inputs, and outputs the watermarked model $\mathcal{M}_i$.

During training, the injection function $\mathcal{I}$ may modify input data or output label to inject the watermark $\mathcal{W}$. In some embodiments, the injection function $\mathcal{I}$ may modify the input data by adding noise, cropping, scaling, rotating, or flipping. In some embodiments, the injection function $\mathcal{I}$ may also modify the output label by changing, swapping, or adding. Additionally or alternatively, the modification may be made randomly or according to a predefined pattern. By modifying, the model can learn to associate the modified data or label with a specific output image containing the watermark $\mathcal{W}$. Then, the watermarked model $\mathcal{M}_i$ is obtained by training the model $\mathcal{M}$ using the modified data or label.

According to embodiments of the present disclosure, in the inference process, the injection function $\mathcal{I}$ may directly modify the model behavior or output distribution to inject the watermark $\mathcal{W}$. For example, the injection function $\mathcal{I}$ may modify the model behavior by changing its activation function, loss function, or optimization algorithm. Additionally or alternatively, in some embodiments, the injection function $\mathcal{I}$ may modify the output distribution by adding noise, shifting, scaling, or clipping. The modification may be made randomly or according to a predefined pattern. According to embodiments of the present disclosure, by the modification, when triggered by a set of input images $\mathcal{X}$, the model exhibits a unique pattern or anomaly containing the watermark $\mathcal{W}$. Then, the watermarked model $\mathcal{M}_i$ is obtained by modifying the model $\mathcal{M}$.

In some embodiments, the extraction of the watermark may be performed with or without accessing the model parameter, depending on the required level of protection. In both cases, the verification function $\mathcal{V}$ may take the model $\mathcal{M}$ or its output as an input, and output a similarity score s indicating the presence or absence of the watermark $\mathcal{W}$. According to the type of watermark, as previously described, the verification function $\mathcal{V}$ may be the same as or similar to the verification function $\mathcal{V}_w$ or $\mathcal{V}_b$.

According to embodiments of the present disclosure, in both cases, the similarity score s may also be compared with a predetermined threshold $\tau$ to determine whether the watermark is valid. If $s<\tau$, the watermark is valid and the model is authentic. On the contrary, if $s>\tau$, it indicates that the watermark is invalid and the model is used unauthorizedly. The threshold t may be set based on prior knowledge or analysis according to the required false positive rate and false negative rate.

Therefore, the method implemented according to the present disclosure differs from previous methods in several aspects. For example, in some embodiments, the method implemented according to the present disclosure may embed two watermarks in white box and black box settings, while only one watermark is embedded conventionally. According to the method disclosed in the present disclosure, a white box watermark may be embedded into a physically consistent image structure output by the model, while the white box watermark is conventionally only embedded into a pixel value or frequency coefficient output by the model.

In some embodiments, the method according to the present disclosure may embed the black box watermark into the probability density function of the data abstractions obtained at the respective layers of the model, while the black box watermark is conventionally only embedded into an output label or a confidence score of the model. According to the methods disclosed in the present disclosure, biological concepts such as DNA watermarking, moving target defense, backdoor training, and decision boundary analysis of model watermarking have been implemented, while these concepts are not previously applied.

Therefore, the method implemented according to the present disclosure enhances the robustness and security of the watermarking solution by using biologically inspired concepts, as it inserts the tag sequence into the model component, periodically refreshes the watermark, injects the watermark sample into the training data, and finds the optimal triggering sample near a decision boundary.

The method implemented according to the present disclosure can help provide protection when developing and deploying deep learning models for various applications (such as image processing, computer vision, natural language processing, or data analysis). The method implemented according to the present disclosure can prevent or detect unauthorized use or redistribution of its deep learning models. The method implemented according to the present disclosure can further provide secure and reliable deep learning models to enhance trust and satisfaction, and these models may perform expected tasks without being subjected to adversarial attacks or interventions. The method implemented according to the present disclosure utilizes biologically inspired concepts and explores effective model watermarking methods.

Figure 8:
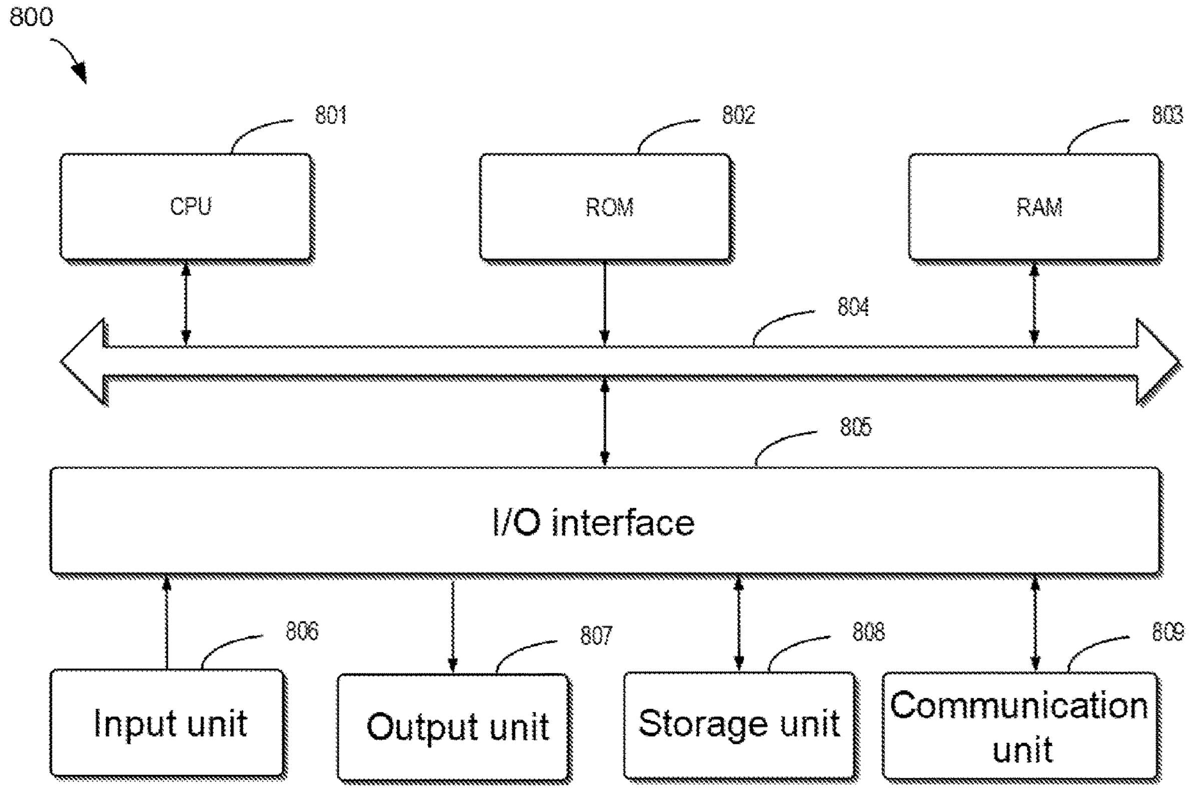
FIG. 8 is a block diagram of an example device that can be used to implement an embodiment of the present disclosure.

FIG. 8 is a block diagram of an example device 800 that can be used to implement an embodiment of the present disclosure. A computing device in FIG. 1 may be implemented using the device 800. As shown in the figure, the device 800 includes a central processing unit (CPU) 801 that may execute various appropriate actions and processing according to computer program instructions stored in a read-only memory (ROM) 802 or computer program instructions loaded from a storage unit 808 to a random access memory (RAM) 803. In the RAM 803, various programs and data required for the operation of the device 800 may also be stored. The CPU 801, the ROM 802, and the RAM 803 are connected to each other through a bus 804. An input/output (I/O) interface 805 is also connected to the bus 804.

A plurality of parts in the device 800 are connected to the I/O interface 805, including: an input unit 806, such as a keyboard and a mouse; an output unit 807, such as various types of displays and speakers; a storage unit 808, such as a magnetic disk and an optical disc; a communication unit 809, such as a network card, a modem, and a wireless communication transceiver. The communication unit 809 allows the device 800 to exchange information/data with other devices via a computer network, such as the Internet, and/or various telecommunication networks.

The various processes and processing described above, such as the method 200, may be performed by the CPU 801. For example, in some embodiments, the method 200 may be implemented as a computer software program that is tangibly included in a machine-readable medium, such as the storage unit 808. In some embodiments, some or all of the computer program may be loaded and/or installed onto the device 800 via the ROM 802 and/or the communication unit 809. When the computer program is loaded into the RAM 803 and executed by the CPU 801, one or more actions of the method 200 described above may be implemented.

Illustrative embodiments of the present disclosure include a method, an apparatus, a system, and/or a computer program product. The computer program product may include a computer-readable storage medium on which computer-readable program instructions for performing various aspects of the present disclosure are loaded.

The computer-readable storage medium may be a tangible device that may retain and store instructions used by an instruction-executing device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, RAM, ROM, an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices or downloaded to an external computer or external storage device over a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in each computing/processing device.

The computer program instructions for performing the operations of the present disclosure may be assembly instructions, instruction set architecture (ISA) instructions, machine instructions, machine-related instructions, microcode, firmware instructions, state setting data, or source code or object code written in any combination of one or more programming languages, wherein the programming languages include object-oriented programming languages such as Smalltalk and C++, and conventional procedural programming languages such as the C language or similar programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer may be connected to a user computer through any kind of networks, including a local area network (LAN) or a wide area network (WAN), or may be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions so as to implement various aspects of the present disclosure.

Various aspects of the present disclosure are described herein with reference to flow charts and/or block diagrams of the method, the apparatus (system), and the computer program product according to embodiments of the present disclosure. It should be understood that each block of the flow charts and/or the block diagrams and combinations of blocks in the flow charts and/or the block diagrams may be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flow charts and/or block diagrams.

The computer-readable program instructions may also be loaded to a computer, another programmable data processing apparatus, or another device, so that a series of operating steps can be performed on the computer, the other programmable data processing apparatus, or the other device to produce a computer-implemented process, such that the instructions executed on the computer, the other programmable data processing apparatus, or the other device can implement the functions/actions specified in one or more blocks in the flow charts and/or block diagrams.

The flow charts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in a reverse order, which depends on involved functions. It should be further noted that each block in the block diagrams and/or flow charts as well as a combination of blocks in the block diagrams and/or flow charts may be implemented using a dedicated hardware-based system that executes specified functions or actions, or using a combination of special hardware and computer instructions.

Various embodiments of the present disclosure have been described above. The above description is illustrative, rather than exhaustive, and is not limited to the disclosed various embodiments. Numerous modifications and alterations will be apparent to persons of ordinary skill in the art without departing from the scope and spirit of the illustrated embodiments. The selection of terms as used herein is intended to best explain the principles and practical applications of the various embodiments and their associated technical improvements, so as to enable persons of ordinary skill in the art to understand the embodiments disclosed herein.

What is claimed is:

1. A method, comprising:

embedding a white box watermark and a black box watermark into a generative model, wherein the black box watermark is embedded in a probability density function of data abstractions in respective layers of the generative model, and in response to completion of embedding the black box watermark, the white box watermark is embedded in the respective layers for outputs of the generative model;

generating model data by the generative model based on predetermined triggering data, wherein the predetermined triggering data comprises at least one of a predetermined triggering text and a predetermined triggering image; and determining an identity associated with the generative model based on the model data;

wherein the method further comprises periodically refreshing one or more of the white box watermark and the black box watermark embedded in the generative model to generate a refreshed watermark, by at least one of:

embedding, in a training stage of the generative model, the refreshed watermark into the generative model by adjusting a difference between a watermark generated by the generative model and a predetermined refreshed watermark to be less than a first designated amount; and embedding, in an inference stage of the generative model, the refreshed watermark into the generative model by perturbing a parameter of the generative model to make a difference between watermark data generated by the generative model and the predetermined refreshed watermark to be higher than a second designated amount.

2. The method according to claim 1, wherein embedding the white box watermark into the generative model comprises:

embedding, in the training stage of the generative model, the white box watermark into the generative model by adjusting a difference between watermark data generated by the generative model and a predetermined white box watermark to be less than a first predetermined threshold; or embedding, in the inference stage of the generative model, the white box watermark into the generative model by perturbing a parameter of the generative model to make a difference between the watermark data generated by the generative model and the predetermined white box watermark to be higher than a second predetermined threshold.

3. The method according to claim 2, wherein determining the identity associated with the generative model based on the model data comprises:

comparing the parameter of the generative model with a parameter of a reference model, and determining, in response to a difference between the parameter of the generative model and the parameter of the reference model being higher than a third predetermined threshold, the generative model as a generative model created by an owner embedding the white box watermark; or comparing the model data generated by the generative model with reference data comprising the predetermined white box watermark, and determining, in response to a difference between the generative model data and the reference data being higher than a fourth predetermined threshold, the generative model as a generative model created by the owner embedding the white box watermark.

4. The method according to claim 1, wherein embedding the black box watermark into the generative model comprises:

embedding, in the training stage of the generative model, the black box watermark into the generative model by modifying input data, wherein the modification comprises one or more of adding noise, adding random perturbation, changing image size or angle, modifying data label, and changing semantic mapping between images; or embedding, in the inference stage of the generative model, the black box watermark into the generative model by modifying a behavior or an output of the generative model.

5. The method according to claim 4, wherein determining the identity associated with the generative model based on the model data comprises:

comparing a data abstraction associated with the model data with reference data, and determining, in response to a difference between the data abstraction and the reference data being higher than a first predetermined threshold, the generative model as a generative model created by an owner embedding the black box watermark; or comparing decoded data decoded from the model data with a predetermined black box watermark, and determining, in response to a difference between the decoded data and the predetermined black box watermark being higher than a second predetermined threshold, the generative model as a generative model created by an owner embedding the black box watermark.

6. The method according to claim 1, further comprising:

modifying one or more model components in the generative model to insert tag data into the one or more model components;

comparing a model parameter of the generative model with a first reference model parameter, and determining, in response to a difference between the model parameter of the generative model and the first reference model parameter being higher than a first predetermined threshold, the generative model as a generative model created by an owner of the modified generative model with the tag data inserted; or comparing a model output of the generative model with a second reference model parameter, and determining, in response to a difference between the model parameter of the generative model and the second reference model parameter being lower than a second predetermined threshold, the generative model as a generative model created by an owner of the modified generative model with the tag data inserted.

7. The method according to claim 1, further comprising:

injecting specifically processed sample data into the generative model, wherein the specific processing comprises adding noise, cropping, scaling, rotating or flipping, changing, and swapping or adding to modify one or more of output labels; and comparing model data output by the generative model with a predetermined watermark, and determining, in response to a difference between the model data and the predetermined watermark being higher than a predetermined threshold, the generative model as a generative model created by an owner of the generative model injected with the specifically processed sample data.

8. The method according to claim 1, further comprising: combining the white box watermark and the black box watermark to form a gray box watermark to be embedded into the generative model.

9. The method according to claim 1, wherein the data abstractions comprise at least one of a feature map and an activation map.

10. The method according to claim 1, wherein the outputs of the generative model include a physically consistent image structure output comprising at least one of an edge and a semantic region.

11. An electronic device, comprising:

at least one processor; and memory coupled to the at least one processor and having instructions stored thereon, wherein the instructions, when executed by the at least one processor, cause the electronic device to perform actions including:

embedding a white box watermark and a black box watermark into a generative model, wherein the black box watermark is embedded in a probability density function of data abstractions in respective layers of the generative model, and in response to completion of embedding the black box watermark, the white box watermark is embedded in the respective layers for outputs of the generative model;

generating model data by the generative model based on predetermined triggering data, wherein the predetermined triggering data comprises at least one of a predetermined triggering text and a predetermined triggering image; and determining an identity associated with the generative model based on the model data;

wherein the actions further comprise periodically refreshing one or more of the white box watermark and the black box watermark embedded in the generative model to generate a refreshed watermark, by at least one of:

embedding, in a training stage of the generative model, the refreshed watermark into the generative model by adjusting a difference between a watermark generated by the generative model and a predetermined refreshed watermark to be less than a first designated amount; and embedding, in an inference stage of the generative model, the refreshed watermark into the generative model by perturbing a parameter of the generative model to make a difference between watermark data generated by the generative model and the predetermined refreshed watermark to be higher than a second designated amount.

12. The electronic device according to claim 11, wherein embedding the white box watermark into the generative model comprises:

embedding, in the training stage of the generative model, the white box watermark into the generative model by adjusting a difference between watermark data generated by the generative model and a predetermined white box watermark to be less than a first predetermined threshold; or embedding, in the inference stage of the generative model, the white box watermark into the generative model by perturbing a parameter of the generative model to make a difference between the watermark data generated by the generative model and the predetermined white box watermark to be higher than a second predetermined threshold.

13. The electronic device according to claim 12, wherein determining the identity associated with the generative model based on the model data comprises:

comparing the parameter of the generative model with a parameter of a reference model, and determining, in response to a difference between the parameter of the generative model and the parameter of the reference model being higher than a third predetermined threshold, the generative model as a generative model created by an owner embedding the white box watermark; or comparing the model data generated by the generative model with reference data comprising the predetermined white box watermark, and determining, in response to a difference between the generative model data and the reference data being higher than a fourth predetermined threshold, the generative model as a generative model created by the owner embedding the white box watermark.

14. The electronic device according to claim 11, wherein embedding the black box watermark into the generative model comprises:

embedding, in the training stage of the generative model, the black box watermark into the generative model by modifying input data, wherein the modification comprises one or more of adding noise, adding random perturbation, changing image size or angle, modifying data label, and changing semantic mapping between images; or embedding, in the inference stage of the generative model, the black box watermark into the generative model by modifying a behavior or an output of the generative model.

15. The electronic device according to claim 14, wherein determining the identity associated with the generative model based on the model data comprises:

comparing a data abstraction associated with the model data with reference data, and determining, in response to a difference between the data abstraction and the reference data being higher than a first predetermined threshold, the generative model as a generative model created by an owner embedding the black box watermark; or comparing decoded data decoded from the model data with a predetermined black box watermark, and determining, in response to a difference between the decoded data and the predetermined black box watermark being higher than a second predetermined threshold, the generative model as a generative model created by an owner embedding the black box watermark.

16. The electronic device according to claim 11, further comprising:

modifying one or more model components in the generative model to insert tag data into the one or more model components;

comparing a model parameter of the generative model with a first reference model parameter, and determining, in response to a difference between the model parameter of the generative model and the first reference model parameter being higher than a first predetermined threshold, the generative model as a generative model created by an owner of the modified generative model with the tag data inserted; or comparing a model output of the generative model with a second reference model parameter, and determining, in response to a difference between the model parameter of the generative model and the second reference model parameter being lower than a second predetermined threshold, the generative model as a generative model created by an owner of the modified generative model with the tag data inserted.

17. The electronic device according to claim 11, further comprising:

injecting specifically processed sample data into the generative model, wherein the specific processing comprises adding noise, cropping, scaling, rotating or flipping, changing, and swapping or adding to modify one or more of output labels; and comparing model data output by the generative model with a predetermined watermark, and determining, in response to a difference between the model data and the predetermined watermark being higher than a predetermined threshold, the generative model as a generative model created by an owner of the generative model injected with the specifically processed sample data.

18. The electronic device according to claim 11, further comprising: combining the white box watermark and the black box watermark to form a gray box watermark to be embedded into the generative model.

19. A computer program product comprising a non-transitory computer-readable storage medium having machine-executable instructions stored therein, wherein the machine-executable instructions, when executed by a machine, cause the machine to perform actions comprising:

embedding a white box watermark and a black box watermark into a generative model, wherein the black box watermark is embedded in a probability density function of data abstractions in respective layers of the generative model, and in response to completion of embedding the black box watermark, the white box watermark is embedded in the respective layers for outputs of the generative model;

generating model data by the generative model based on predetermined triggering data, wherein the predetermined triggering data comprises at least one of a predetermined triggering text and a predetermined triggering image; and determining an identity associated with the generative model based on the model data;

wherein the actions further comprise periodically refreshing one or more of the white box watermark and the black box watermark embedded in the generative model to generate a refreshed watermark, by at least one of:

embedding, in a training stage of the generative model, the refreshed watermark into the generative model by adjusting a difference between a watermark generated by the generative model and a predetermined refreshed watermark to be less than a first designated amount; and embedding, in an inference stage of the generative model, the refreshed watermark into the generative model by perturbing a parameter of the generative model to make a difference between watermark data generated by the generative model and the predetermined refreshed watermark to be higher than a second designated amount.

20. The computer program product according to claim 19, wherein embedding the white box watermark into the generative model comprises:

embedding, in the training stage of the generative model, the white box watermark into the generative model by adjusting a difference between watermark data generated by the generative model and a predetermined white box watermark to be less than a first predetermined threshold; or embedding, in the inference stage of the generative model, the white box watermark into the generative model by perturbing a parameter of the generative model to make a difference between the watermark data generated by the generative model and the predetermined white box watermark to be higher than a second predetermined threshold.

* * * * *